(12) United States Patent
Kubota

(10) Patent No.: US 8,260,043 B2
(45) Date of Patent: Sep. 4, 2012

(54) IMAGE PROCESSING APPARATUS, IMAGE FORMING APPARATUS, IMAGE PROCESSING METHOD, AND RECORDING MEDIUM ON WHICH IMAGE PROCESSING PROGRAM IS RECORDED

(75) Inventor: Kazuhisa Kubota, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 937 days.

(21) Appl. No.: 12/285,676

(22) Filed: Oct. 10, 2008

(65) Prior Publication Data

US 2009/0116738 A1 May 7, 2009

(30) Foreign Application Priority Data

Oct. 10, 2007 (JP) .................................. 2007-264922

(51) Int. Cl.
*G06K 9/00* (2006.01)
(52) U.S. Cl. ........ 382/165; 382/168; 382/170; 382/171; 382/175
(58) Field of Classification Search .................. 382/165, 382/168, 170, 171, 175
See application file for complete search history.

(56) References Cited

U.S. PATENT DOCUMENTS 6,021,221 A * 2/2000 Takaha ........................... 382/199
7,248,732 B2 * 7/2007 Kuwabara ..................... 382/149
7,949,187 B2 * 5/2011 Nakamura ..................... 382/177

FOREIGN PATENT DOCUMENTS

| CA | 1261754 A | 8/2000 |
|---|---|---|
| JP | 6-245003 A | 9/1994 |
| JP | 9-233321 A | 9/1997 |
| JP | 2002-77669 A | 3/2002 |
| JP | 2002-232708 A | 8/2002 |
| JP | 2003-298859 A | 10/2003 |
| JP | 2005-286571 A | 10/2005 |

* cited by examiner

*Primary Examiner* — Wai Sing Louie
(74) *Attorney, Agent, or Firm* — Birch, Stewart, Kolasch & Birch, LLP

(57) ABSTRACT

Based on average values for respective color components calculated by an average value calculating section, a histogram generating section obtains, for respective pixels of interest, a maximum value of the average values among the color components and a maximum difference in the average values among the color components, and generates histograms respectively for the maximum value and the maximum difference in which histograms a number of pixels for a density bin is considered as a frequency-of-occurrence value. A determination section obtains a number of density bin having a predetermined frequency-of-occurrence value or more for each of the histograms for the maximum value and the maximum difference, and determines that the data of image is of a blank page image when both of the numbers of density bins are not greater than a bin threshold value which is set according to scanning modes or printing modes.

10 Claims, 13 Drawing Sheets

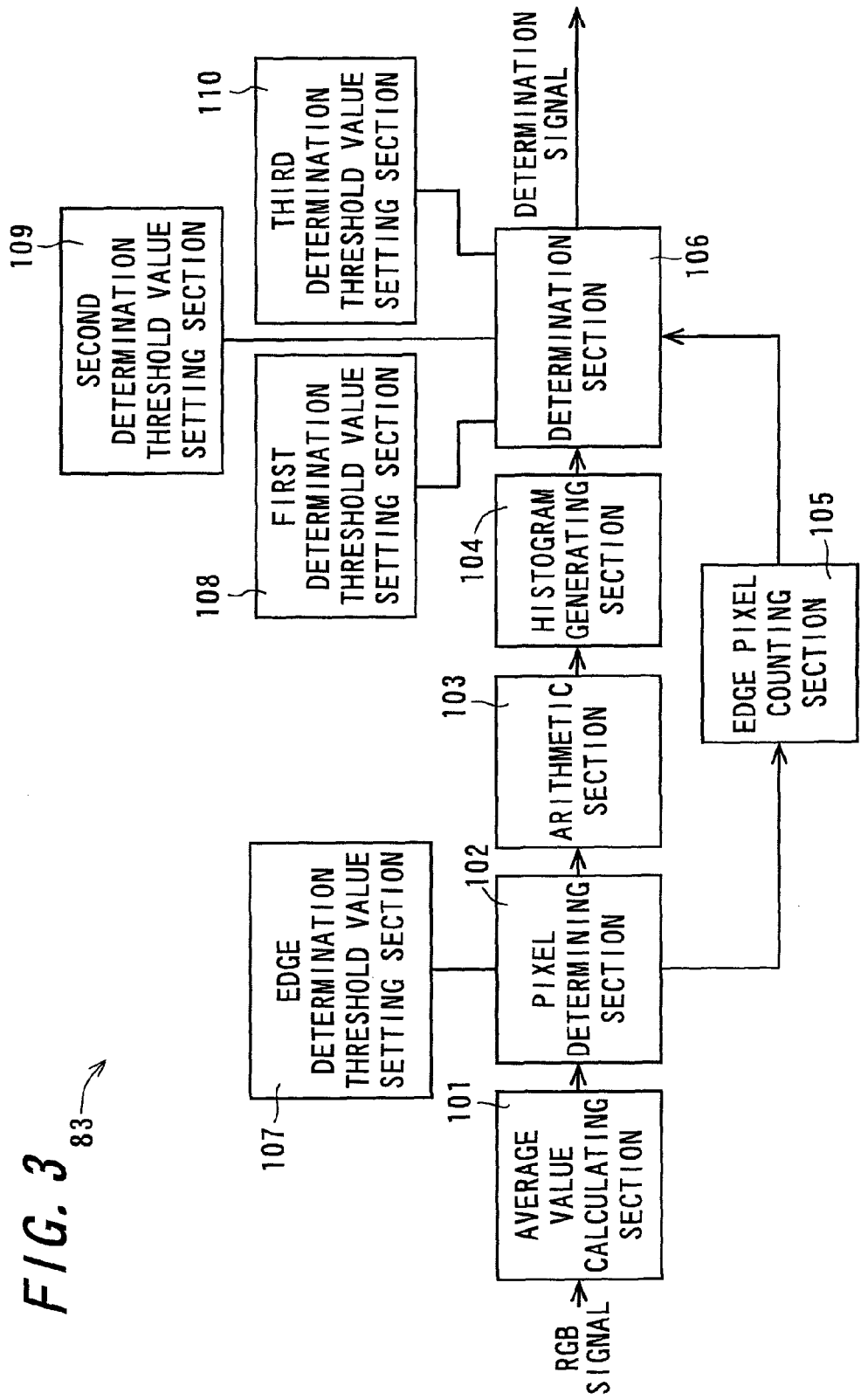

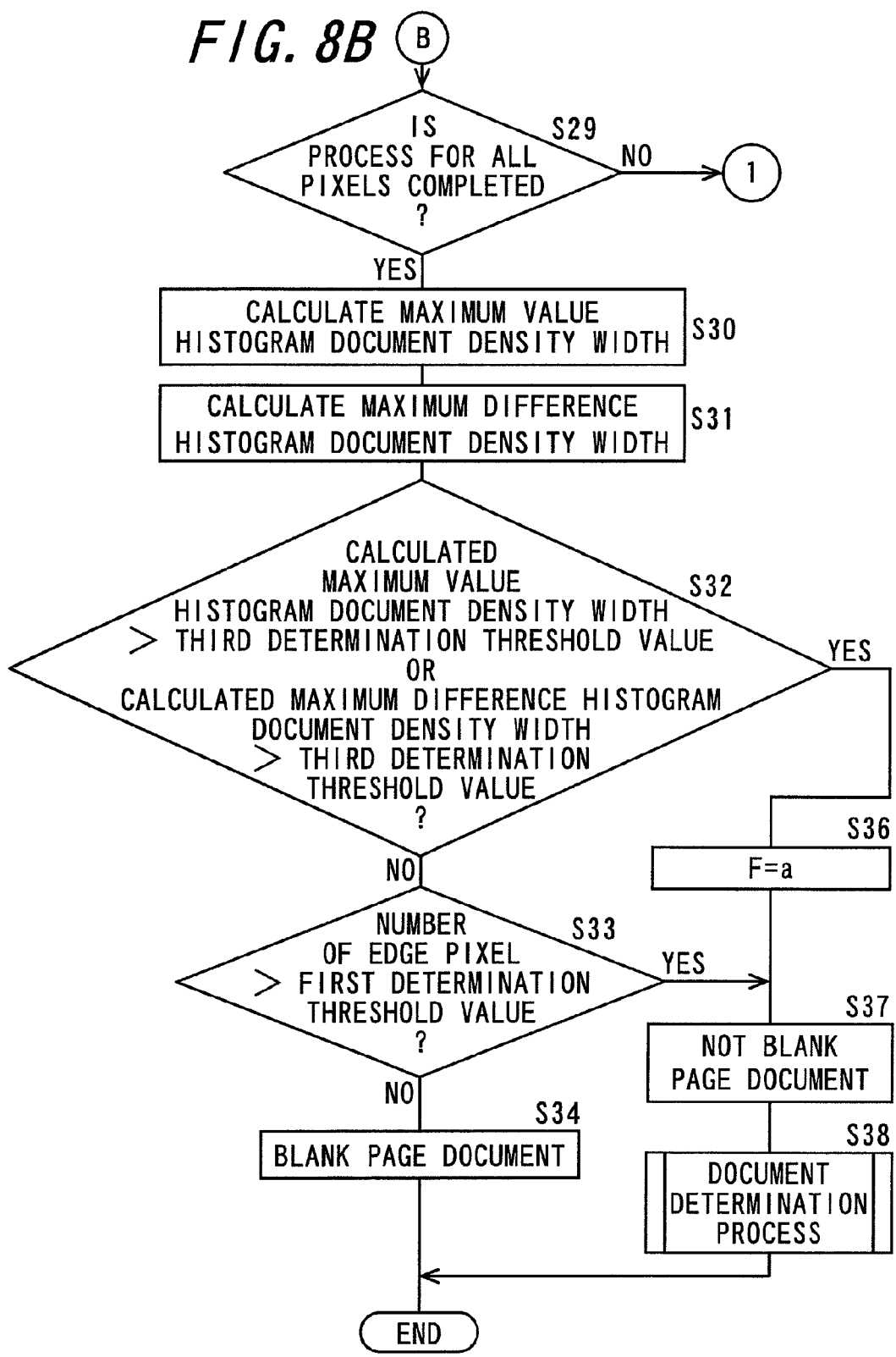

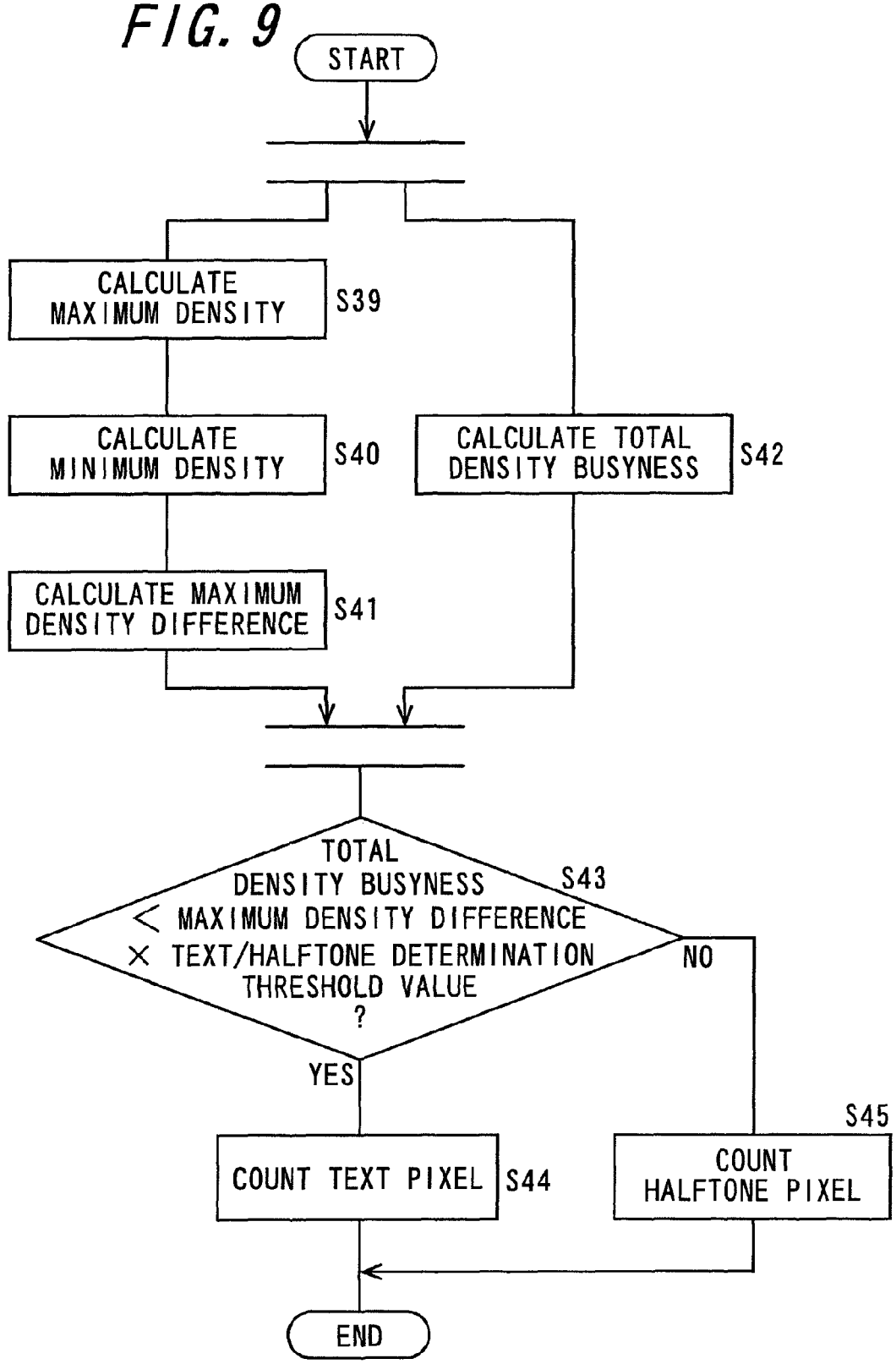

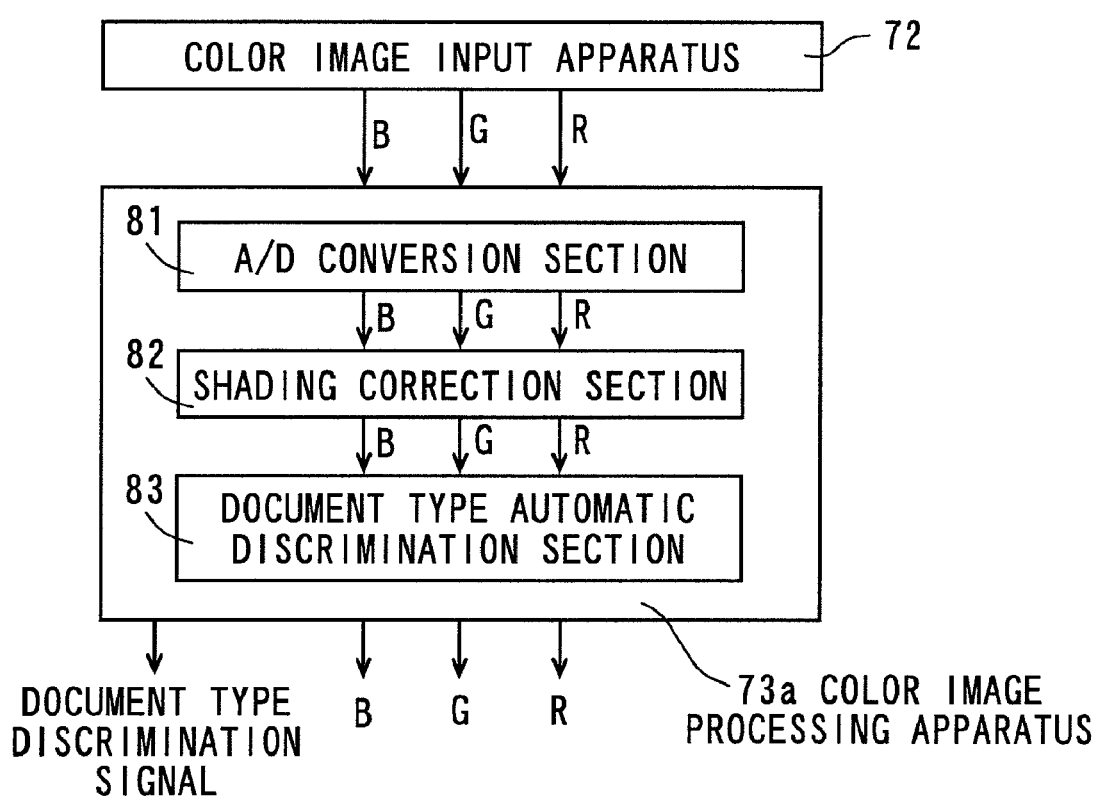

IMAGE PROCESSING APPARATUS, IMAGE FORMING APPARATUS, IMAGE PROCESSING METHOD, AND RECORDING MEDIUM ON WHICH IMAGE PROCESSING PROGRAM IS RECORDED

CROSS-REFERENCE TO RELATED APPLICATION

This application claims priority to Japanese Patent Application No. 2007-264922, which was filed on Oct. 10, 2007, the contents of which are incorporated herein by reference in its entirety.

BACKGROUND OF THE INVENTION

1. Field of the Invention

The present invention relates to an image processing apparatus, an image forming apparatus, an image processing method, and a recording medium on which an image processing program is recorded that determine whether a document to be read is a double-sided document or a single-sided document.

2. Description of the Related Art

In a copier or image reading apparatus, when a double-sided document is copied by an automatic document feeding apparatus, etc., or a document image is sent by electronic mail to a predetermined e-mail address as 'scan to e-mail', a user needs to separate the documents into single-sided documents and double-sided documents first by hand and then needs to perform reading operation on respective documents if a plurality of documents to be read include both single-sided documents and double-sided documents. Hence, the user needs to rearrange outputted documents in the original order.

On the other hand, if reading is performed without thus separating the documents, unwanted blank sheets are outputted. Particularly when color blank sheets are mixed, color toner (ink) is to be wastefully consumed. Also, when read document image data is stored, storage space of a hard disk or the like is to be wastefully used.

To solve the problems described above, the following methods are proposed.

In an invention described in Japanese Unexamined Patent Publication JP-A 9-233321 (1997), when a user has selected a blank document page skip mode between a blank document page insert mode and the blank document page skip mode, a blank document detecting portion detects a blank document from data of image by comparing the data of image with blank reference data. The detected data of image is then discarded and an image forming operation is skipped. On the other hand, when the user has selected the blank document page insert mode, the inserting of blank page data enables image forming operation to be performed.

When the above-described related techniques are used, it is necessary for the user to select the blank document page skip mode or the blank document page insert mode for every copying operation or every document scanning operation, thus causing complication in operation.

In addition, the blank document determination is not fully made in a case where a document having suffered offset fails to be determined to be a blank document, or in a case where a document on which a text is written in pencil is determined to be a blank document, or in the like case. At this time, excess or deficiency of pages occurs, and thus an adjusting operation or a confirming operation is required.

Furthermore, since a color blank page document is not considered at all in the related art, determination cannot be made on a color blank page image, such as a blue or green blank page image.

SUMMARY OF THE INVENTION

An object of the invention is to provide an image processing apparatus, an image forming apparatus, an image processing method, and a recording medium on which an image processing program is recorded that are capable of discriminating a blank page image with high accuracy regardless of monochrome or color.

The invention provides an image processing apparatus that determines, based on data of image including a plurality of pixels, whether the data of image is of a blank page image, the apparatus comprising:

a determination section that performs a determination process to determine whether the data of image is of a blank page image by comparing features calculated from the data of image with a threshold value; and a setting section that sets, when at least one of scanning modes in reading data of image from a document or output modes in printing out data of image is inputted, the threshold value used in the determination process in accordance with the mode inputted.

According to the invention, the determination section makes a comparison between features calculated from data of image and a threshold value, and performs a determination process to determine whether the data of image is of a blank page image. And the setting section sets, when at least one of scanning modes in reading data of image from a document or output modes in printing out data of image is inputted, the threshold value used in the determination process in accordance with the mode inputted.

This makes it possible to set a threshold value best suited for the scanning modes or the output modes, thus making it possible to determine a blank page image with high accuracy.

Further, the invention provides an image processing apparatus that determines, based on data of image including a plurality of pixels, whether the data of image is of a blank page image, the apparatus comprising:

an average value calculating section that calculates, for respective color components, an average value of pixel values within a first pixel block composed of a plurality of pixels including a pixel of interest, to define the calculated average values as a pixel value of the pixel of interest;

a histogram generating section that obtains, for respective pixels of interest, a maximum value of the average values among the color components and a maximum difference in the average values among the color components, based on the average values for the respective color components which are calculated by the average value calculating section, and generates histograms respectively for the maximum value and the maximum difference in which histograms a number of pixels for a density bin is considered as a frequency-of-occurrence value;

a determination section that obtains a number of density bin having a predetermined frequency-of-occurrence value or more for each of the histograms for the maximum value and the maximum difference which are generated by the histogram generating section, respectively, and determines that the data of image is of a blank page image when both of the numbers of density bins are less than or equal to a bin threshold value; and a setting section that sets, when at least one of scanning modes in reading data of image from a document or output modes in printing out data of image is inputted, the bin threshold value in accordance with the mode inputted.

According to the invention, the average value calculating section calculates, for respective color components, an average value of pixel values within a first pixel block composed of a plurality of pixels including a pixel of interest, to define the calculated average values as a pixel value of the pixel of interest. Based on the average values for the respective color components which are calculated by the average value calculating section, the histogram generating section obtains, for respective pixels of interest, a maximum value of the average values among the color components and a maximum difference in the average values among the color components, and generates histograms respectively for the maximum value and the maximum difference in which histograms a number of pixels for a density bin is considered as a frequency-of-occurrence value.

The determination section obtains the number of density bin having a predetermined frequency-of-occurrence value or more for each of the histograms for the maximum value and the maximum difference which are generated by the histogram generating section, respectively, and determines that the data of image is of a blank page image when both of the numbers of density bins are less than or equal to a bin threshold value.

When there is inputted at least one of scanning modes in reading data of image from a document such as a static scanning mode, a feed scanning mode, and a duplex document scanning mode, or when there is inputted at least one of output modes in printing out data of image such as a single-sided printing mode, a double-sided printing mode, and a multiup printing mode, the setting section sets the bin threshold value in accordance with the mode inputted.

This makes it possible to set a threshold value best suited for the scanning modes or the outputted modes. Further, the influences of isolated dots and noise upon scanning, and moreover, the influences of stains on a page background portion and dust attached to the page background portion can be suppressed, enabling to determine a blank page image with high accuracy regardless of monochrome or color.

Further, in the invention, it is preferable that the image processing apparatus further comprises a pixel determining section that calculates, for respective color components, density information about density in a second pixel block composed of a plurality of pixels including a pixel of interest, compares the calculated density information with a predetermined density threshold value to determine whether the pixel of interest is an edge pixel, and counts a number of pixels determined to be edge pixels, the determination section determines that the data of image is of a blank page image when both of the numbers of density bins are less than or equal to the bin threshold value and the number of pixels determined to be edge pixels is less than or equal to a number-of-pixel threshold value, and the setting section sets, when at least one of scanning modes in reading data of image from a document or output modes in printing out data of image is inputted, the number-of-pixel threshold value in accordance with the mode inputted.

According to the invention, the pixel determining section calculates, for respective color components, density information about density (pixel value) in a second pixel block composed of a plurality of pixels including a pixel of interest, compares the calculated density information with a predetermined density threshold value to determine whether the pixel of interest is an edge pixel, and counts the number of pixels determined to be edge pixels.

The determination section determines that the data of image is of a blank page image when both of the numbers of density bins are less than or equal to the bin threshold value and the number of pixels determined to be edge pixels is less than or equal to a number-of-pixel threshold value.

When at least one of scanning modes in reading data of image from a document or output modes in printing out data of image is inputted, the setting section sets the number-of-pixel threshold value in accordance with the mode inputted.

By considering the number of edge pixels as a criterion, a blank page document determination can be made with higher accuracy.

Further, the invention provides an image forming apparatus including the above-described image processing apparatus.

According to the invention, since the image forming apparatus includes the above-described image processing apparatus, a blank page document determination can be made with high accuracy and the amount of use of color materials, such as toner and ink, can be reduced, enabling to provide an easy-to-use image forming apparatus by which troublesome work for the user is saved.

Further, the invention provides an image processing method in which based on data of image including a plurality of pixels, it is determined whether the data of image is of a blank page image, the method comprising:

a determination step of performing a determination process to determine whether the data of image is of a blank page image by comparing features calculated from the data of image with a threshold value; and a setting step of setting, when at least one of scanning modes in reading data of image from a document or output modes in printing out data of image is inputted, the threshold value used in the determination process in accordance with the mode inputted.

According to the invention, in the determination step, a comparison is made between features calculated from image of data and a threshold value, and a determination is made to determine whether the data of image is of a blank page image. For the determination, in the setting step, when at least one of scanning modes in reading data of image from a document or output modes in printing out data of image is inputted, the threshold value used in the determination is set in accordance with the mode inputted.

This makes it possible to set a threshold value best suited for the scanning modes or the outputted modes, thus making it possible to determine a blank page image with high accuracy.

Further, the invention provides an image processing method in which based on data of image including a plurality of pixels, it is determined whether the data of image is of a blank page image, the method comprising:

an average value calculation step of calculating, for respective color components, an average value of pixel values within a first pixel block composed of a plurality of pixels including a pixel of interest, to define the calculated average values as a pixel value of the pixel of interest;

a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value;

a determination step of obtaining a number of density bin having a predetermined frequency-of-occurrence value or more for each of the histograms for the maximum value and the maximum difference which are generated in the histogram generation step, respectively, and determining that the data of image is of a blank page image when both of the numbers of density bins are less than or equal to a bin threshold value; and a setting step of setting, when at least one of scanning modes in reading data of image from a document or output modes in printing out data of image is inputted, the bin threshold value in accordance with the mode inputted.

According to the invention, in the average value calculation step, an average value of pixel values is calculated for respective color components within a first pixel block composed of a plurality of pixels including a pixel of interest, to define the calculated average values as a pixel value of the pixel of interest. In the histogram generation step, based on the average values for the respective color components which are calculated in the average value calculation step, a maximum value of the average values among the color components and a maximum difference in the average values among the color components are found for respective pixels of interest, and histograms respectively for the maximum value and the maximum difference are generated in which histograms a number of pixels for a density bin is considered as a frequency-of-occurrence value.

In the determination step, the number of density bin having a predetermined frequency-of-occurrence value or more are obtained for each of the histograms for the maximum value and the maximum difference which are generated in the histogram generation step, respectively, and it is determined that the data of image is of a blank page image when both of the numbers of density bins are less than or equal to a bin threshold value.

In the setting step, when there is inputted at least one of scanning modes in reading data of image from a document such as a static scanning mode, a feed scanning mode, and a duplex document scanning mode, or when there is inputted at least one of output modes in printing out data of image such as a single-sided printing mode, a double-sided printing mode, and a multiup printing mode, the bin threshold value is set in accordance with the mode inputted.

This makes it possible to set a threshold value best suited for the scanning modes or the outputted modes. Further, a blank page image determination can be made with high accuracy regardless of monochrome or color, by suppressing the influences of isolated dots and noise upon scanning, and moreover, the influences of stains on a page background portion and dust attached to the page background portion.

Further, in the invention, it is preferable that the image processing method further comprises a pixel determination step of calculating, for respective color components, density information about density in a second pixel block composed of a plurality of pixels including a pixel of interest, comparing the calculated density information with a predetermined density threshold value to determine whether the pixel of interest is an edge pixel, and counting a number of pixels determined to be edge pixels, in the determination step, it is determined that the data of image is of a blank page image when both of the numbers of density bins are less than or equal to the bin threshold value and the number of pixels determined to be edge pixels is less than or equal to a number-of-pixel threshold value, and in the setting step, when at least one of scanning modes in reading data of image from a document or output modes in printing out data of image is inputted, the number-of-pixel threshold value is set in accordance with the mode inputted.

According to the invention, in the pixel determination step, density information about density is calculated for respective color components in a second pixel block composed of a plurality of pixels including a pixel of interest, the calculated density information is compared with a predetermined density threshold value to determine whether the pixel of interest is an edge pixel, and the number of pixels determined to be edge pixels is counted.

In the determination step, it is determined that the data of image is of a blank page image when both of the numbers of density bins are less than or equal to the bin threshold value and the number of pixels determined to be edge pixels is less than or equal to a number-of-pixel threshold value.

In the setting step, when at least one of scanning modes in reading data of image from a document or output modes in printing out data of image is inputted, the number-of-pixel threshold value is set in accordance with the mode inputted.

By considering the number of edge pixels as a criterion, a blank page document determination can be made with higher accuracy.

Further, an image processing program for causing a computer to perform the above-described image processing method may be provided.

Further, a computer-readable recording medium on which an image processing program for causing a computer to perform the above-described image processing method is recorded may be provided.

BRIEF DESCRIPTION OF THE DRAWINGS

Other and further objects, features, and advantages of the invention will be more explicit from the following detailed description taken with reference to the drawings wherein:

FIG. 3 is a block diagram showing a configuration of a document type automatic discrimination section;

FIGS. 8A and 8B are flowcharts showing a discrimination process of the document type automatic discrimination section;

FIG. 9 is a flowchart showing a text/halftone pixel determination process;

FIG. 11 is a block diagram showing a configuration of an image reading apparatus according to another embodiment of the invention.

DETAILED DESCRIPTION

Figure 1:
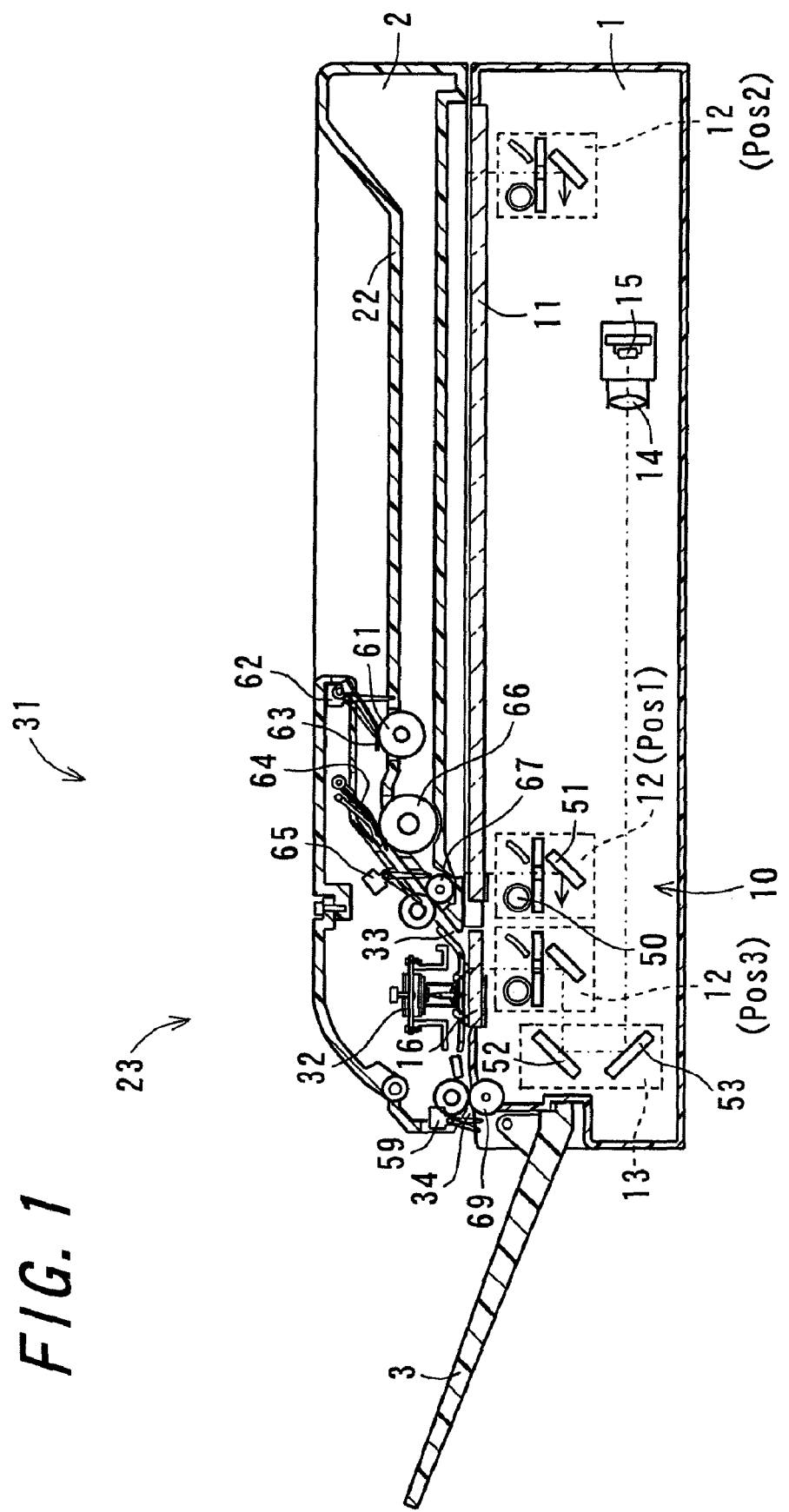
FIG. 1 is a section view showing a configuration of an image reading apparatus according to an embodiment of the invention.

Now referring to the drawings, preferred embodiments of the invention are described below.

FIG. 1 is a section view showing a configuration of an image reading apparatus according to an embodiment of the invention. As shown in FIG. 1, the image reading apparatus is composed of a lower housing 1, an upper housing 2, and a document output tray 3. In the image reading apparatus, reading of image is performed from a document in a static scanning mode in which an image is read from a document kept still, in a feed scanning mode in which an image is scanned from a document being fed, or in a duplex document scanning mode in which an image is read from both sides of a document being fed. A selection of these modes (scanning modes) is inputted by an operation section disposed in a later-described image forming apparatus. For example, as a method of selecting the scanning modes, a method is applied in which upon pressing a copy button in a state where the document is set in a document set tray and the document is detected by a document set detecting sensor, the image reading apparatus is set to scan in the feed scanning mode. And in reading in the duplex document scanning mode, the setting to the duplex document scanning mode is made by the above-described operation section. In addition, as the method of selecting the scanning modes, there is applied a method in which upon pressing the copy button in a state where no document is set in the document set tray (a state where no document is detected by the document set detecting sensor), the image reading apparatus performs reading of image in the static scanning mode.

Reading of image is performed by a first scanning section 10 inside the lower housing 1 in the static scanning mode, and on the other hand, scanning of image is performed by a second read section 23 inside the upper housing 2. In addition, in the duplex document scanning mode, the first scanning section 10 and the second scanning section 23 are used simultaneously.

As shown in FIG. 1, the lower housing 1 is composed of the first scanning section 10 and a first contact glass 11. The first scanning section 10 includes a first scanning unit 12, a second scanning unit 13, an image focusing lens 14, a CCD (Charge Coupled Device) image sensor 15, and a second contact glass 16.

The first contact glass 11 is a platen on which a document to be scanned in the static scanning mode is placed. The first scanning unit 12 exposes the document while moving from left to right along the first contact glass 1 at a constant rate V. Further, the first scanning section 10 has a light source (exposing lamp) 50, and a first reflecting mirror 51 which brings reflected light of the document to the second scanning unit 13.

The second scanning unit 13 moves at a rate of V/2 following the first scanning unit 12, and includes a second reflecting mirror 52 and a third reflecting mirror 53 which bring the light from the first reflecting mirror 51 to the image focusing lens 14 and the CCD image sensor 15.

The image focusing lens 14 focuses reflected light from the third reflecting mirror 53 into an image on the CCD image sensor 15. The CCD image sensor 15 converts lights from the image focusing lens 14 into an analog electrical signal. Note that the electrical signal will be converted into digital data of image by a later-described image processing apparatus.

Further, the first scanning section 10 has a function of reading the document placed on the first contact glass 11, and further has a function, as will be described below, of reading images of the document being fed by a member of the upper housing 2.

Further, in reading the document on the first contact glass 11, the first scanning unit 12 only moves a predetermined distance in accordance with a size of document detected by a document size detecting section, in a direction from a position of Pos 1 toward a position of Pos 2 as shown in FIG. 1. On the other hand, in reading a document being fed, the first scanning unit 12 stops at a position of Pos 3 shown in FIG. 1. Further, when being on standby without being used, the first scanning unit 12 stops at a position (home position) of Pos 0 (not shown) located between the position of Pos1 and the position of Pos 3 shown in FIG. 1.

On front of an end portion of the first contact glass 11, a document criterion board (not shown) is disposed on which is shown an index indicating a size and a placement direction of a document to be placed on the first contact glass 11. Therefore, a user can easily place the document to the first contact glass 11 in accordance with the index.

The second scanning section 23 is designed for reading images of the document placed on the document set tray 22, and includes a document feed system 31, an image sensor portion 32, a document path 33, and a document output portion 34.

The document feed system 31 takes in the document placed on the document set tray 22 and feeds the document thus taken in to the document path 33. The image sensor portion 32 reads images of a document being fed. The document output portion 34 outputs to the document output tray 3 the document of which images have been read by the image sensor portion 32.

The document feed system 31 includes a feed-in aiding roller 61, a document set detecting sensor 62, a document pressing plate 63, a friction pad 64, a feed timing sensor 65, a feed-in roller 66, and a pair of alignment rollers 67.

The feed-in aiding roller 61 and the document pressing plate 63 are used for pulling the document detected by the document set detecting sensor 62 into the second scanning section 23. The friction pad 64, the feed-in roller 66 and the pair of alignment rollers 67 bring the document thus pulled, into the image sensor portion 32 piece by piece on the basis of the detection result of the feed timing sensor 65.

Note that the pair of alignment rollers 67 each have an electromagnetic clutch at drive shafts thereof, can control transmission of drive force from a driving motor, and come to a standstill in the absence of the document. The alignment rollers 67 are disposed to rotate in a direction in which the document is fed downstream, when a leading end of paper has been brought into contact with the feed timing sensor 65 and a predetermined signal has been transmitted from the sensor. When the leading end of the document fed from an upstream side by the friction pad 64 and the feed-in roller 66 runs into a nip portion of the pair of alignment rollers 67, the pair of alignment rollers 67 provides a predetermined level of flexibility at a suspended state to the document. After that, the pair of alignment rollers 67 rotates so that the document is fed downstream. At this time, with the aid of the nip portion of the pair of alignment rollers 67, the leading end of the document is arranged to be perpendicular to the direction in which the document is fed. Further, the pair of alignment rollers 67, together with the second contact glass 16, has a part of document path 33 formed therebetween.

The document output portion 34 has a pair of document output rollers 69 and a document output sensor 59. An upper roller of the pair of document output rollers 69 is a roller located on a driving side, and is integrally disposed with the upper housing 2 leftwards and driven by a driving mechanism inside the upper housing 2. The upper roller of the pair of the document output rollers 69 and a lower roller (a driven roller)

of the pair of the document output rollers 69 which is rotatably disposed on a side of the lower housing 1 have a function of nipping and feeding the document having passed the document path 33 and then outputting the fed document onto the document output tray 3. A control portion performs control to shift the lower roller on the basis of a sorting signal, so that the document is sorted.

Further, the document output sensor 59 is disposed at a downstream side of the pair of document output rollers 69, and transmits to a later-described read control portion information representing that the document has been outputted.

The image sensor portion (CIS: Contact Image Sensor) 32 is disposed inside the upper housing 2 and designed for reading an image on the upper side of the document moving along the document path 33.

Next, descriptions will be given to a reading process of the reading apparatus.

In a static scanning mode, only a single-sided scanning mode can be selected and only the first scanning section 10 is used for reading of the document. At this time, the first scanning unit 12 of the first scanning section 10 is located at the home position firstly. Then, in accordance with an instruction of the read control portion, the first scanning unit 12 moves towards the position of Pos 2 from the position of Pos 1 with the second scanning unit 13 while scanning the document placed on the first contact glass 11. By doing so, it is possible to expose the CCD image sensor 15 to reflected light corresponding to a document image. In this way, the first scanning section 10 reads an image formed on the underside (surface) of a still document.

In a feed scanning mode, the single-sided scanning mode and the duplex document scanning mode both can be selected. When in a traveling single-sided scanning mode, only the first scanning section 10 is used for reading of the document. Upon receiving an instruction of this mode, the first scanning unit 12 of the first scanning section 10 moves from the home position to the position of Pos 3 and then stops thereat. In as-is state, the second scanning unit 12 reads a moving document. And then, in accordance with an instruction of the read control portion, the CCD image sensor 15 reads from below the document, via the second contact glass 16, a document image to be fed along the document path 33. That is, the first scanning section 10 reads the image formed on the underside (surface) of the document.

When in the duplex document scanning mode of the feed scanning mode, the first scanning section 10 and the image sensor portion 32 are both used for reading of the document. At this time, as in the case of the traveling single-sided scanning mode, the first scanning unit 12 of the first scanning section 10 is stopped at the position of Pos 3 shown in FIG. 1.

Then, in accordance with an instruction of the read control portion, the first scanning section 10 reads from below the document, via the second contact glass 16, a document image to be fed along the document path 33. Moreover, similarly, the image sensor portion 32 reads from above the image formed on the upper side (backside) of the document to be fed.

In this way, when the image reading apparatus is in the duplex document scanning mode, the first scanning section 10 and the image sensor portion 32 read the image on both sides of the document being fed from above and from below at the same time.

Figure 2:
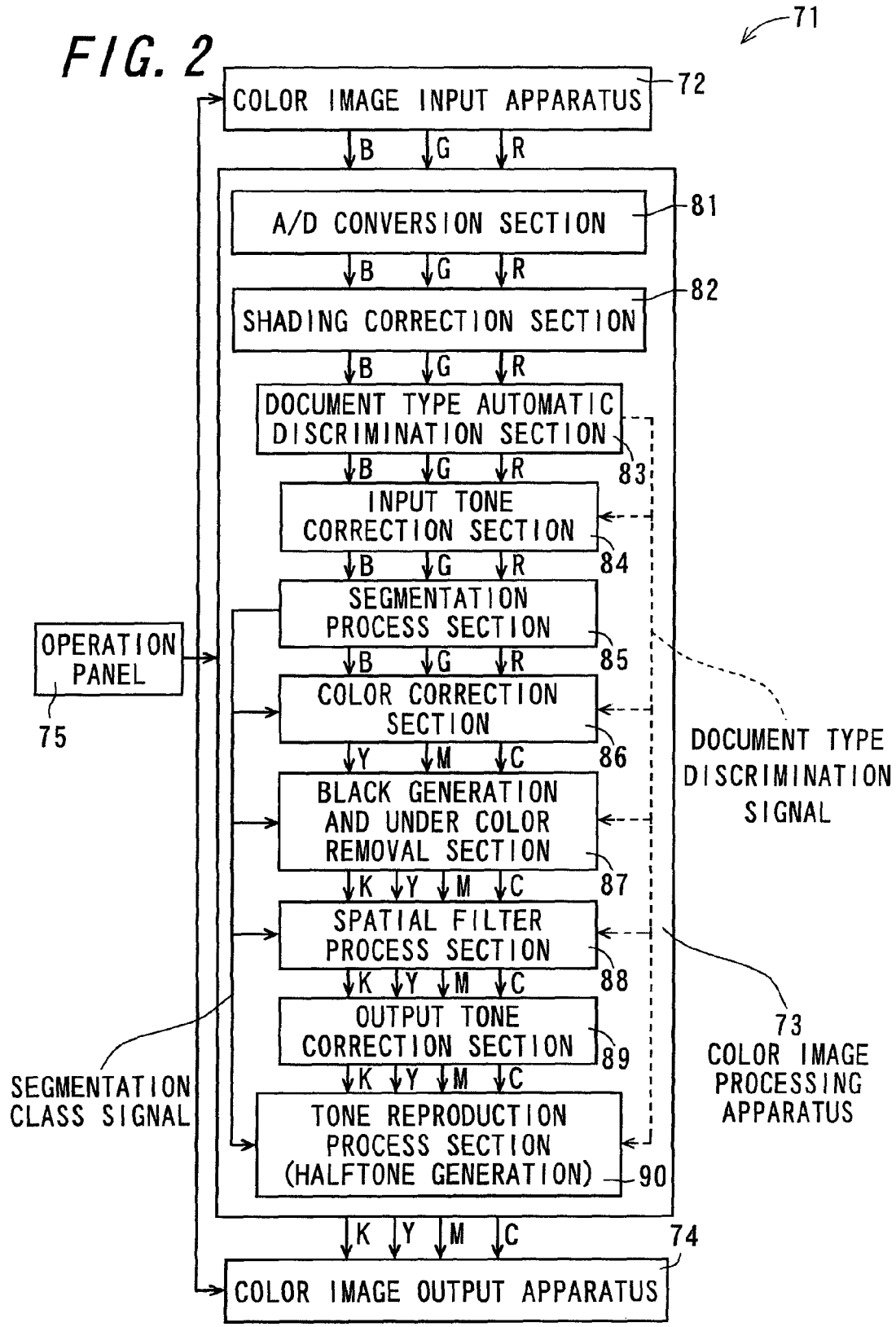
FIG. 2 is a block diagram showing a configuration of an image forming apparatus according to an embodiment of the invention.

FIG. 2 is a block diagram showing a configuration of an image forming apparatus 71 according to an embodiment of the invention. In the present embodiment, the image forming apparatus 71 is applied to an electrophotographic digital color copier.

The image forming apparatus 71 includes a color image input apparatus 72, a color image processing apparatus 73, a color image output apparatus 74, and an operation panel 75. The color image processing apparatus 73 includes an A/D (analogue/digital) conversion section 81, a shading correction section 82, a document type automatic discrimination section 83, an input tone correction section 84, a segmentation process section 85, a color correction section 86, a black generation and under color removal section 87, a spatial filter process section 88, an output tone correction section 89, and a tone reproduction process section 90.

The color image input apparatus 72 which is an image scanning section includes, for example, a scanner section (not shown) including a CCD image sensor. The color image input apparatus 72 reads a reflected light image from a document by the CCD image sensor as data of image composed of analogue signals respectively corresponding to RGB (R: Red, G: Green, and A: Blue) and representing the reflectivity of reflected light from a recording medium such as paper on which a document image is recorded, and inputs the data of image to the color image processing apparatus 73. The data of image of analogue signals to be provided to the color image processing apparatus 73 from the color image input apparatus 72 is rasterized.

The data of image read by the color image input apparatus 72 is transmitted to the A/D conversion section 81, the shading correction section 82, the document type automatic discrimination section 83, the input tone correction section 84, the segmentation process section 85, the color correction section 86, the black generation and under color removal section 87, the spatial filter process section 88, the output tone correction section 89, and the tone reproduction process section 90 which are included in the color image processing apparatus 73, in this order and outputted to the color image output apparatus 74 as data of image represented by digital color signals respectively corresponding to CMYK (C: Cyan, M: Magenta, Y: Yellow, and K: Black).

The A/D (analogue/digital) conversion section 81 converts the data of image of analogue signals respectively corresponding to RGB into data of image of digital signals. The shading correction section 82 performs a process of removing various distortions occurring in a lighting system, an image focusing system, and an image sensing system of the color image input apparatus 72, on the data of image of digital signals respectively corresponding to RGB, which is sent from the A/D conversion section 81. Also, the shading correction section 82 makes a color balance adjustment.

The document type automatic discrimination section 83 converts the RGB signals (RGB reflectivity signals) from which various distortions have been removed and on which a color balance adjustment has been made by the shading correction section 82, into signals, such as density (pixel value) signals, which are easy for the color image processing apparatus 73 to process, and determines whether the document is a blank document (a non-image document, a blank page document). If it is determined that the document is a blank document, then subsequent processes are cancelled. If it is determined that the document is not a blank document, then the subsequent processes continue.

The document type automatic discrimination section 83 may be configured to make not only a blank document determination but also a document type discrimination such as whether the document is a text document or a printed-picture document or a text and printed-picture document including both text and a printed-picture.

A document type discrimination signal representing a document type and generated by the document type automatic discrimination section 83 is outputted to the input tone correction section 84, the color correction section 86, the black generation and under color removal section 87, the spatial filter process section 88, and the tone reproduction process section 90. Note that a detail of the document type automatic discrimination section 83 will be described later.

The input tone correction section 84 performs a process of removing background density and an image quality adjustment process such as contrast. The color of the background (a sheet on which text, etc., are printed) of a document varies. For example, the background color of a yellowish one, such as coarse paper, needs to be treated as white; otherwise, when printing out the document, extra recording agent is also used for a blank portion (background portion). Therefore, by the input tone correction section 84, background density is removed, i.e., the density of the background is brought to the density of a white color, and at the same time, contrast is adjusted. The input tone correction section 84 provides data of image composed of density signals respectively corresponding to RGB, to the segmentation process section 85.

The segmentation process section 85 determines to which one of a page background region, a photograph (photographic-paper picture, continuous tone) region like a silver halide photography, a text region, and a halftone region respective pixels in the data of image inputted to the color image processing apparatus 73 by the density signals respectively corresponding to RGB, belong, and determine whether they are color or monochrome. In the present embodiment, the segmentation indicates that a pixel in the data of one image is separated into either one of a text region, a photograph region (continuous tone region), a page background region or a halftone region, and color or monochrome. The text region represents characters including text and symbols. The page background region represents a background portion of a document. The segmentation process section 85 outputs, based on segmentation results, a segmentation class signal indicating to which region respective pixels belong, to the color correction section 86, the black generation and under color removal section 87, the spatial filter process section 89, and the tone reproduction process section 90, and outputs to the subsequent color correction section 86 the density signals, without any modification, which respectively correspond to RGB and which are outputted from the input tone correction section 84.

The color correction section 86 converts the density signals (input signals) respectively corresponding to RGB provided from the segmentation process section 85, into density signals (hereinafter, referred to as CMY signals) respectively corresponding to CMY, according to the segmentation class signal provided from the segmentation process section 85. The conversion of the density signals respectively corresponding to RGB into signals respectively corresponding to CMY is performed by the color correction section 86. In order to implement faithful color reproduction, the color correction section 86 performs a process of removing color impurity based on the spectral characteristics of CMY color materials containing unnecessary absorption components. The color correction section 86 also performs color conversion based on the document type discrimination signal provided from the document type automatic discrimination section 83.

The black generation and under color removal section 87 performs a black generation process in which a black signal corresponding to black (K) is generated from the CMY signals corresponding to CMY which have been subjected to color correction by the color correction section 86, and a process of generating new CMY signals by subtracting the K signal obtained through the black generation from the document CMY signals. With these processes, the CMY signals are converted into signals of four colors, CMYK (hereinafter, referred to as CMYK signals).

The black generation and under color removal section 87 performs, as an example of the black generation process, black generation by skeleton black. In the black generation by skeleton black, when the input-output characteristics of a skeleton curve is $y=f(x)$, densities respectively corresponding to C, M, and Y to be inputted are respectively C, M, and Y, densities respectively corresponding to C, M, Y, and K to be outputted are respectively C', M', Y', and K', and the UCR (Under Color Removal) rate is $\alpha$ ($0<\alpha<1$), in a black generation and under color removal process, by the following equation (1), density signals of three colors, CMY, are converted into density signals of four colors, CMYK.

$$\begin{cases} K' = f\{\min(C, M, Y)\} \\ C' = C - \alpha K' \\ M' = M - \alpha K' \\ Y' = Y - \alpha K' \end{cases} \quad (1)$$

The spatial filter process section 88 performs a spatial filter process using a digital filter which is set in advance for respective regions, on the data of image of CMYK signals provided from the black generation and under color removal section 87, according to the segmentation class signal provided from the segmentation process section 85, to correct spatial frequency characteristics, whereby a blur of an output image and deterioration of graininess are prevented.

As with the spatial filter process section 88, the tone reproduction process section 90 performs a predetermined process on the data of image of CMYK signals provided from the output tone correction section 89, according to the segmentation class signal provided from the segmentation process section 85. For example, for a region segmented into the text region by the segmentation process section 85, in order particularly to improve the reproducibility of achromatic text or chromatic text, the amount of high-frequency component is emphasized by an edge enhancement process in a spatial filter process performed by the spatial filter process section 88, and the tone reproduction process section 90 performs a binarization or multi-level dithering process for a high-resolution screen suitable for reproducing high-frequency component. For a region segmented into the halftone region by the segmentation process section 85, the spatial filter process section 88 performs a low-pass filtering process to remove input halftone components. Then, the output tone correction section 89 performs an output tone correction process in which signals, such as density signals, are converted into a halftone area ratio which is a characteristic value of the color image output apparatus 74, and thereafter, finally, the tone reproduction process section 90 performs a tone reproduction process (halftone generation) in which an image is separated into pixels such that their respective tones can be reproduced. For a region segmented into the photograph region by the segmentation process section 85, a binarization or multi-level dithering process on a screen suitable for tone reproduction is performed.

The operation panel 75 includes, for example, a display section, such as a liquid crystal display, and operation keys. Information to be inputted from the operation panel 75 is provided to a control section (not shown).

Data of image to be outputted from the tone reproduction process section 90, i.e., data of image having been subjected to the foregoing processes, is temporarily stored in a storage section, read out at predetermined timing, and inputted to the color image output apparatus 74.

The color image output apparatus 74 is an image forming section and outputs the data of image as an image to a recording medium (e.g., a sheet material such as paper). The color image output apparatus 74 is capable of forming an image on a recording medium using recording agents of two or more colors. In the present embodiment, the color image output apparatus 74 can form an image on a recording medium using recording agents of C, M, Y, and K colors. The color image output apparatus 74 forms an image using a recording agent of C for data of image corresponding to C, forms an image using a recording agent of M for data of image corresponding to M, forms an image using a recording agent of Y for data of image corresponding to Y, and forms an image using a recording agent of K for data of image corresponding to K. Although in the present embodiment the color image output apparatus 74 is implemented by an electrophotographic printer apparatus, in another embodiment of the invention, the color image output apparatus 74 may be implemented by an inkjet printer apparatus. Respective sections of the color image processing apparatus 73 are controlled by a control section (not shown). The control section includes a CPU (Central Processing Unit) and a storage medium storing a control program which is executed and processed by the CPU. When the CPU executes the control program, the color image input apparatus 72, the color image processing apparatus 73, and the color image output apparatus 74 are controlled.

Figure 4A:
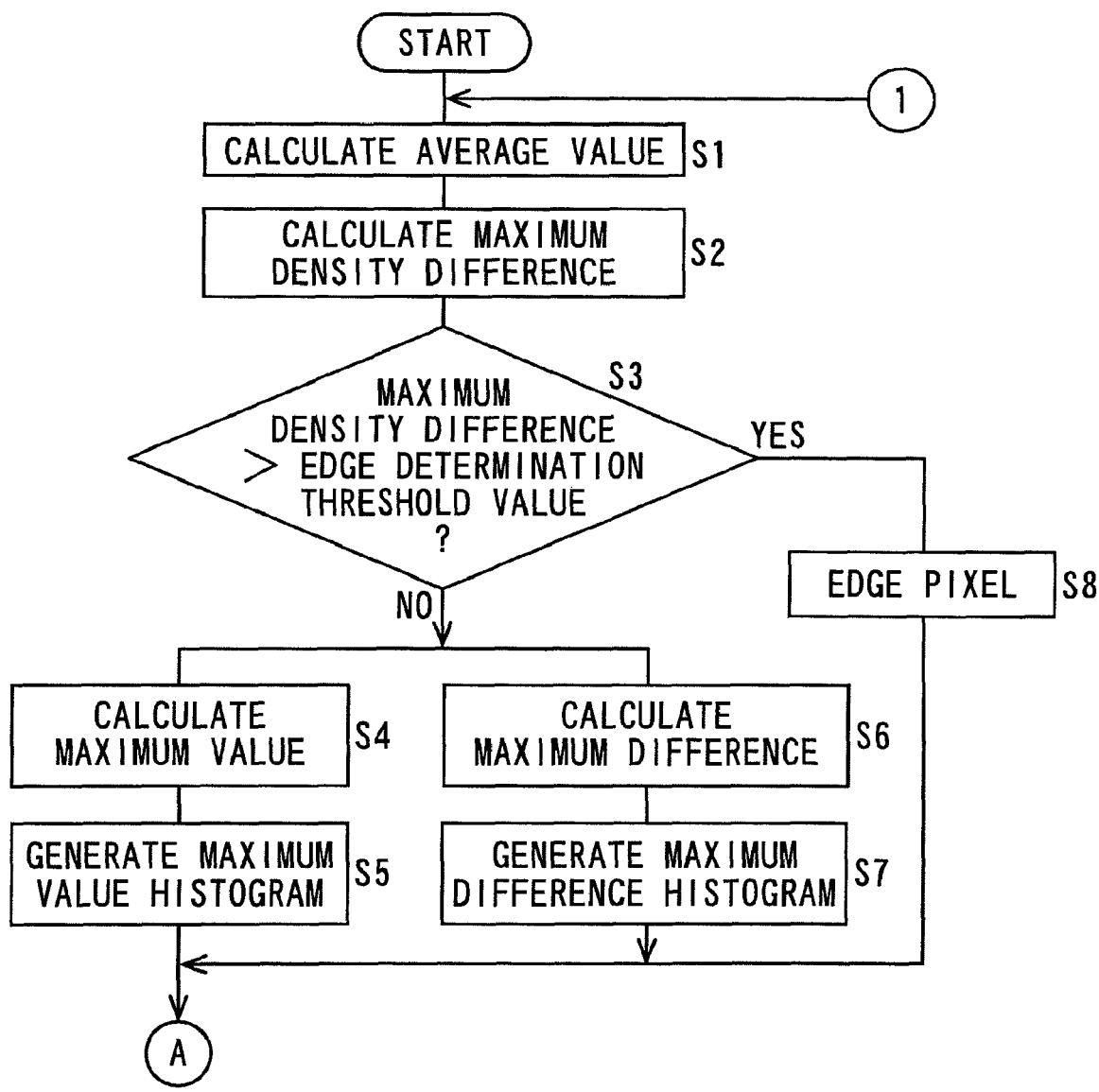
FIGS. 4A and 4B are flowcharts showing a determination process performed by the document type automatic discrimination section.
Figure 4B:
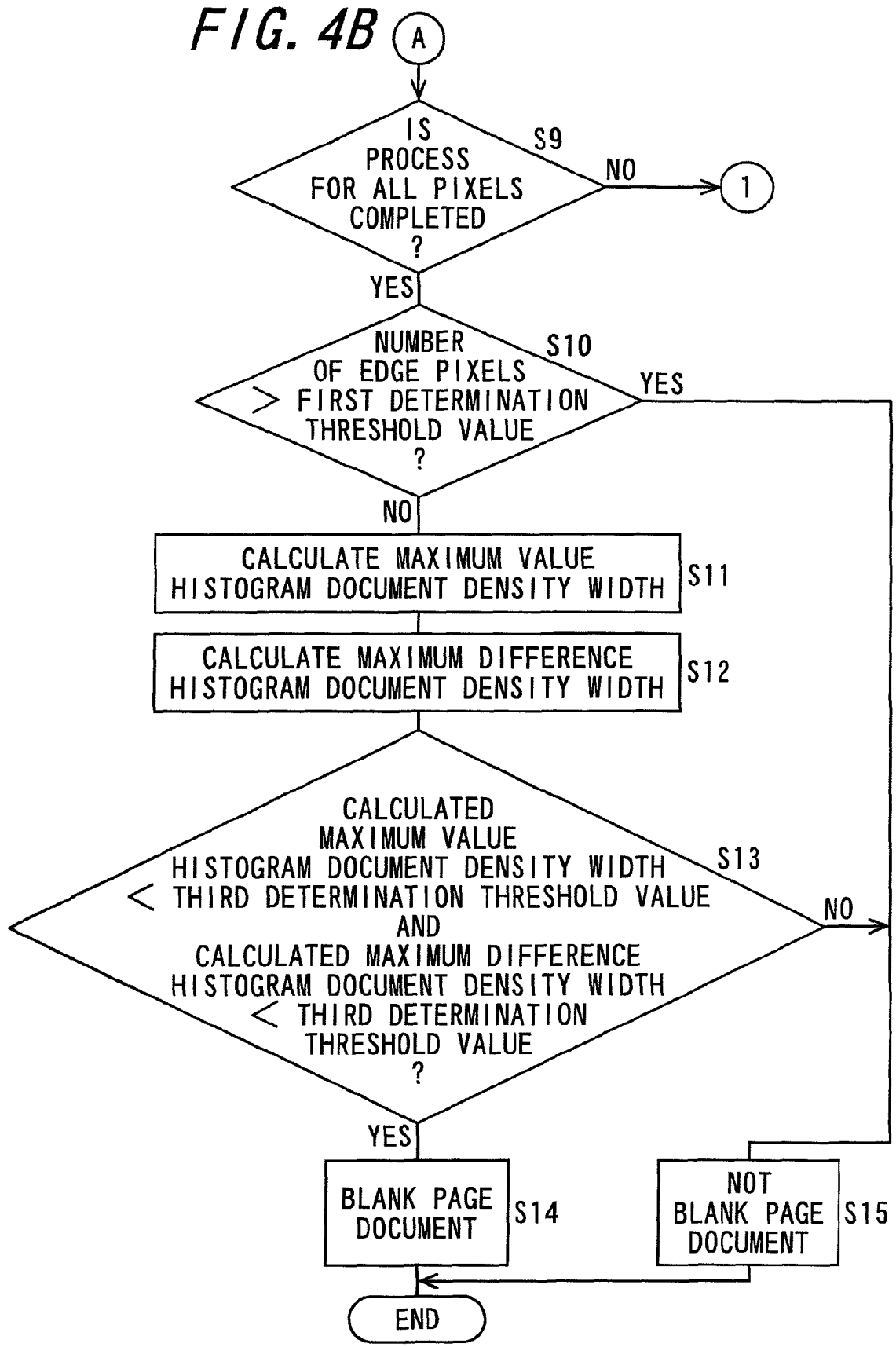

FIG. 3 is a block diagram showing a configuration of the document type automatic discrimination section 83. FIGS. 4A and 4B are flowcharts showing a determination process performed by the document type automatic discrimination section 83.

As shown in FIG. 3, the document type automatic discrimination section 83 includes an average value calculating section 101, a pixel determining section 102, an arithmetic section 103, a histogram generating section 104, an edge pixel counting section 105, a determination section 106, an edge determination threshold value setting section 107, a first determination threshold value setting section 108, a second determination threshold value setting section 109, and a third determination threshold value setting section 110.

The average value calculating section 101 calculates, for respective RGB planes (respective color components), an average value of density values within a block (e.g., 7×7 pixels) composed of a plurality of pixels including a pixel of interest, to define the average values as a pixel value of the pixel of interest (step S1). The pixel determining section 102 calculates, for respective RGB planes (each color component), a maximum density difference within a block (e.g., 7×7 pixels) composed of a plurality of pixels and including a pixel of interest (step S2), and compares the maximum density differences with an edge determination threshold value provided from the edge determination threshold value setting section 107 to determine whether the pixel of interest in the block belongs to an edge pixel (step S3). Specifically, when any of the maximum density differences of a plurality of color components is greater than or equal to the threshold value, the pixel of interest is determined to be an edge pixel (step S8). For a method of determining an edge, in addition to a method using such maximum density differences, a method may be employed in which a variance value is found and if the variance value is greater than or equal to a threshold value, then a pixel of interest is determined to be an edge pixel.

Pixels that are determined to be edge pixels by the pixel determining section 102 are counted by the edge pixel counting section 105.

Subsequently, the arithmetic section 103 compares the average values for the respective planes (respective color components) of the pixel of interest which are calculated by the average value calculating section 101, to calculate, for respective pixels of interest, a maximum value and a maximum difference in the average values among the color components (steps S4 and S6). Then, the histogram generating section 104 generates histograms respectively for the maximum value and the maximum difference (steps S5 and S7). The number of density bins is, for example, 16.

It is determined whether the process for all pixels is completed (step S9). If not completed, then the above-described processes from step S1 to step S8 are repeated on a next pixel block. If completed, the determination section 106 then compares the number of edge pixels counted by the edge pixel counting section 105 with a first determination threshold value provided from the first determination threshold value setting section 108 (step S10). If the number of edge pixels is greater than the first determination threshold value, it indicates that either a text region or a halftone region is present, and thus, it is determined that the document is not a blank page document (step S15). Furthermore, the determination section 106 compares the number of edge pixels counted by the edge pixel counting section 105 with a first determination threshold value provided from the first determination threshold value setting section 108. If the number of edge pixels is less than or equal to the first determination threshold value, then it is determined that the document is either a blank page document or a photographic-paper picture document. If it is determined to be a blank page document or a photographic-paper picture document, then the determination section 106 compares the histograms respectively for the maximum value and the maximum difference generated by the histogram generating section 104, with a second determination threshold value provided from the second determination threshold value setting section 109, to calculate, for each of the maximum value and the maximum difference, a total value for the number of bins in which the frequency-of-occurrence value is greater than the second determination threshold value, to use the total values respectively as a maximum value histogram document density width and a maximum difference histogram document density width (steps S11 and S12).

Each of the calculated maximum value histogram document density width and maximum difference histogram document density width is compared with a third determination threshold value provided from the third determination threshold value setting section 110 (step. S13). If each of the calculated maximum value histogram document density width and maximum difference histogram document density width is smaller than the third determination threshold value, then the document is determined to be a blank page document (step S14).

Although the above shows the configuration including the pixel determining section 102, without providing the pixel determining section 102, by using the average values calculated by the average value calculating section 101, a maximum value and a maximum difference in the average values for respective color components may be calculated, histograms respectively for the maximum value and the maximum difference may be generated, and determination on whether the document is a blank page document may be made. In this case, in addition to determinations of a maximum value histogram document density width and a maximum difference histogram document density width, the number of maximum difference histogram document density widths is detected and if each of the maximum value histogram document density width and the maximum difference histogram document density width is smaller than a third determination threshold value (e.g., 3) and the number of maximum difference histogram document density widths is 1, then the document is determined to be a blank page document.

In accordance with a control signal from a control section, optimum threshold value settings are performed in the edge determination threshold value setting section 107, the first determination threshold value setting section 108, the second determination threshold value setting section 109, and the third determination threshold value setting section 110 shown in FIG. 3. The control signal includes scanning modes (a static scanning mode, a feed scanning mode, and a duplex document scanning mode) of an image reading apparatus, operation control information (output modes such as a single-sided printing mode, a double-sided printing mode, and a multiup printing mode) of the color image output apparatus 73 inputted by means of an operation panel 75, and the like information.

Threshold Value Setting in Static Scanning Mode

In a static scanning mode, a threshold value is so set that the edge pixel is easily determined and no document is determined to be a blank page document, since a user performs operation while confirming if a document is a blank page document or not on a document-to-document basis regardless of whether the operation control information of the color image output apparatus 73 is the single-sided printing, the double-sided printing, or the multiup printing. For example, the edge determination threshold value is set to 5, the first determination threshold value to zero, the second determination threshold value to zero, and the third determination threshold value to 0. In addition, the determination result of the determination section 106 shown in FIG. 3 may be directly replaced by a determination signal representing not being a blank page document.

Threshold Value Setting in Single-Sided Printing of Feed Scanning Mode and Duplex Document Scanning Mode In a single-sided printing of the feed scanning mode and the duplex document scanning mode, a threshold value is so set that a document is liable to be determined to be a blank page document, since even when documents may contain a blank page document and a document has been determined to be a blank page document due to a false determination, a page having suffered the false determination is re-printed and easily inserted to an appropriate place. For example, the edge determination threshold value is set to 30, the first determination threshold value to 7000, the second determination threshold value to 1000, and the third determination threshold value to 5.

Threshold Value Setting in Double-Sided Printing and Multiup Printing of Feed Scanning Mode and Duplex Document Scanning Mode In double-sided printing and multiup printing of feed scanning mode and duplex document scanning mode, in a case where documents may contain a blank page document and a document has been determined to be a blank page document by mistake, some pages may be missing, it is very complicated to fill in the missing pages when page sequence is important, and further waste of paper happens. Therefore, a threshold value is so set that a determination of being a blank page document can be made without fail. For example, the edge determination threshold value is set to 30, the first determination threshold value to 5000, the second determination threshold value to 500, and the third determination threshold value to 3.

Note that for a method of determining a blank page document, in addition to the methods as have been mentioned above, a method may be applied in which pixel numbers of black pixel and white pixel are counted and undergone a threshold value processing to determine whether a document is a blank page document. For example, as described in Japanese Unexamined Patent Publication. JP-A 6-245003 (1994), blank page document determination may be made using a method in which a number of black pixels is counted, and some image is present on a document (that is, the document is not a blank page document) when the number of black pixels is equal to or greater than a threshold value. In this case, in accordance with a document scanning mode and a document output mode, the threshold value may be changed as mentioned above. A threshold value based on which it is unlikely to determine a document to be a blank page document and a threshold value based on which blank page document determination can be made without fail, may be suitably set in advance with use of a variety of image samples.

Histograms which are generated by the histogram generating section 104 will be described in detail below.

Figure 5A:
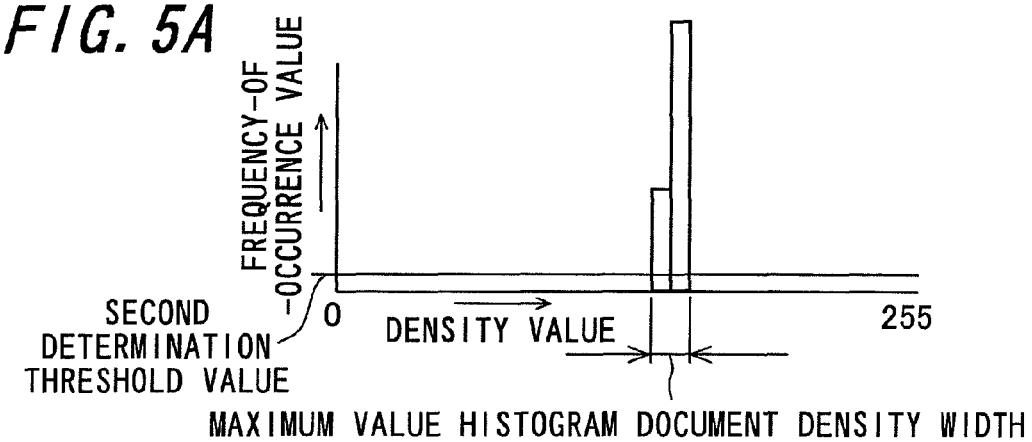
FIGS. 5A to 5C are diagrams showing examples of a maximum value histogram.
Figure 5B:
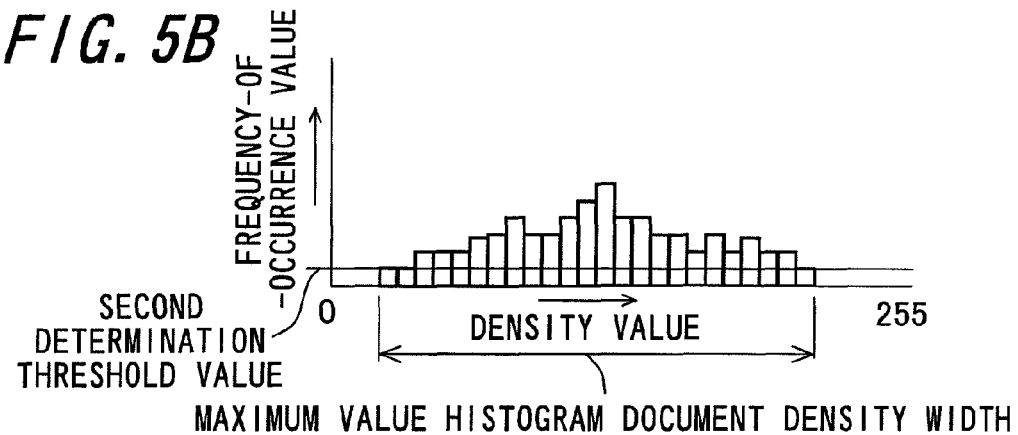
Figure 5C:
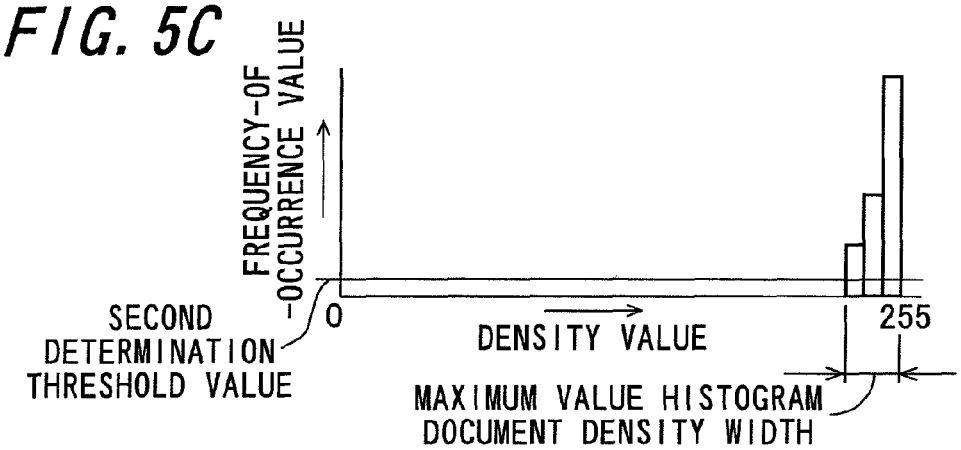
Figure 6A:
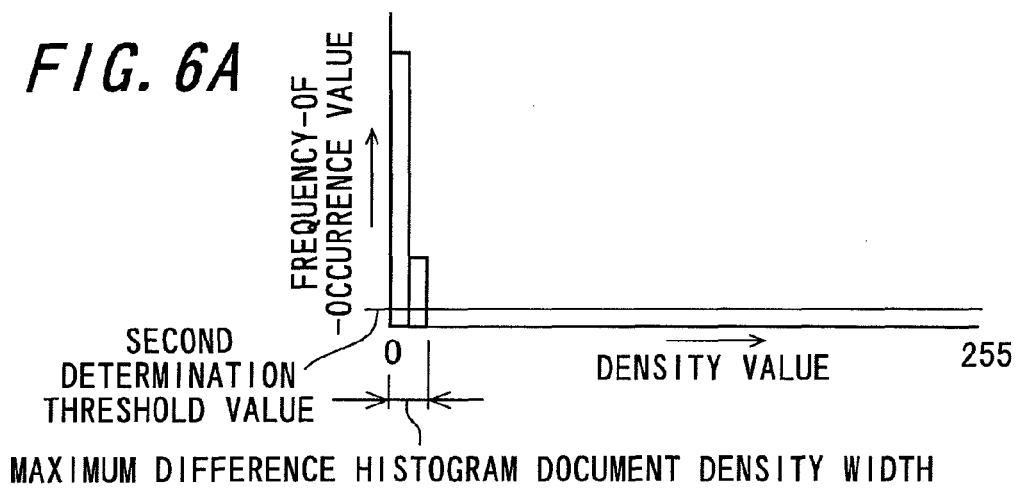
FIGS. 6A to 6C are diagrams showing examples of a maximum difference histogram.
Figure 6B:
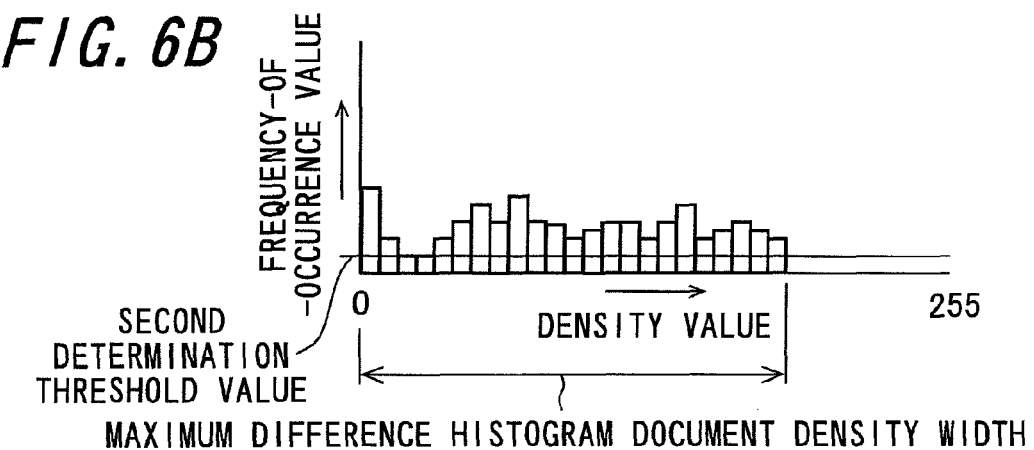
Figure 6C:
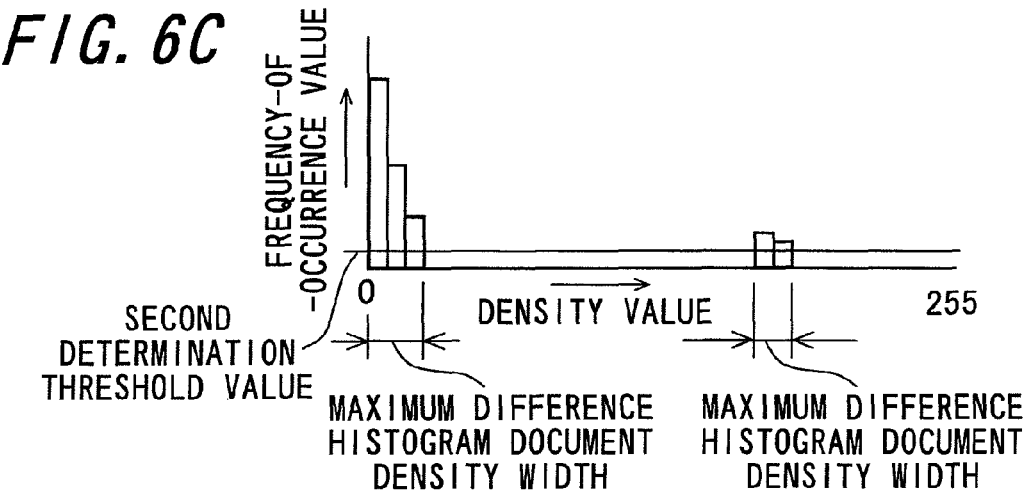

FIGS. 5A to 5C are diagrams showing examples of the maximum value histogram and FIGS. 6A to 6C are diagrams showing examples of the maximum difference histogram.

Examples of histograms for a blank page document are shown in FIGS. 5A and 6A.

For a blank page document, since there are only pixels of a monochrome density, as shown in the drawings, both a maximum value histogram and a maximum difference histogram are formed such that frequencies of occurrence are present only in limited density bins (e.g., one to two bins). Also, a document with a larger density value (pixel value) where a frequency of occurrence of the maximum value histogram is present can be considered to be a brighter document and a document with a smaller density value can be considered to be a darker document. For the maximum difference histogram, a document with a larger density value where a frequency of occurrence is present can be considered to be a chromatic document and a document with a smaller density value can be considered to be an achromatic document. For example, when in the maximum value histogram, a frequency of occurrence is present at one location where the density value is 255 and in the maximum difference histogram, a frequency of occurrence is present at one location where the density value is 0, the document is determined to be a blank document.

Examples of histograms for a photographic-paper picture document are shown in FIGS. 5B and 6B.

Since a photographic-paper picture document is represented by various densities, both a maximum value histogram and a maximum difference histogram are formed such that frequencies of occurrence are present in broad density bins. For the maximum difference histogram, a document with frequencies of occurrence present in broad density bins can be considered to be a chromatic document and a document with frequencies of occurrence present in limited density bins can be considered to be a monochrome photographic-paper picture document. Particularly, a document with frequencies of occurrence present in low density bins can be considered to be an achromatic photographic-paper picture document. For example, when in both the maximum value histogram and the maximum difference histogram, frequencies of occurrence are present in a broad density range, the document is determined to be a color photographic-paper picture document.

Examples of histograms for a text document are shown in FIGS. 5C and 6C.

For a text document, since a large background density is present, both a maximum value histogram and a maximum difference histogram are formed in a manner very similar to the blank page document. However, in the maximum difference histogram, frequencies of occurrence are present in density bins of text portions, and above all, the number of edge pixels by text is present and thus a clear distinction can be made between a blank page document and a text document.

For a halftone document too, since frequencies of occurrence are present in various density bins, both a maximum value histogram and a maximum difference histogram are formed such that frequencies of occurrence are present in a broad density range. Note, however, that for a halftone document since a halftone is counted as an edge, the halftone document can be distinguished from a photographic-paper picture document.

The case will be described in which a document type automatic discrimination section 83*a* makes a type discrimination between a blank page document and other documents.

Figure 7:
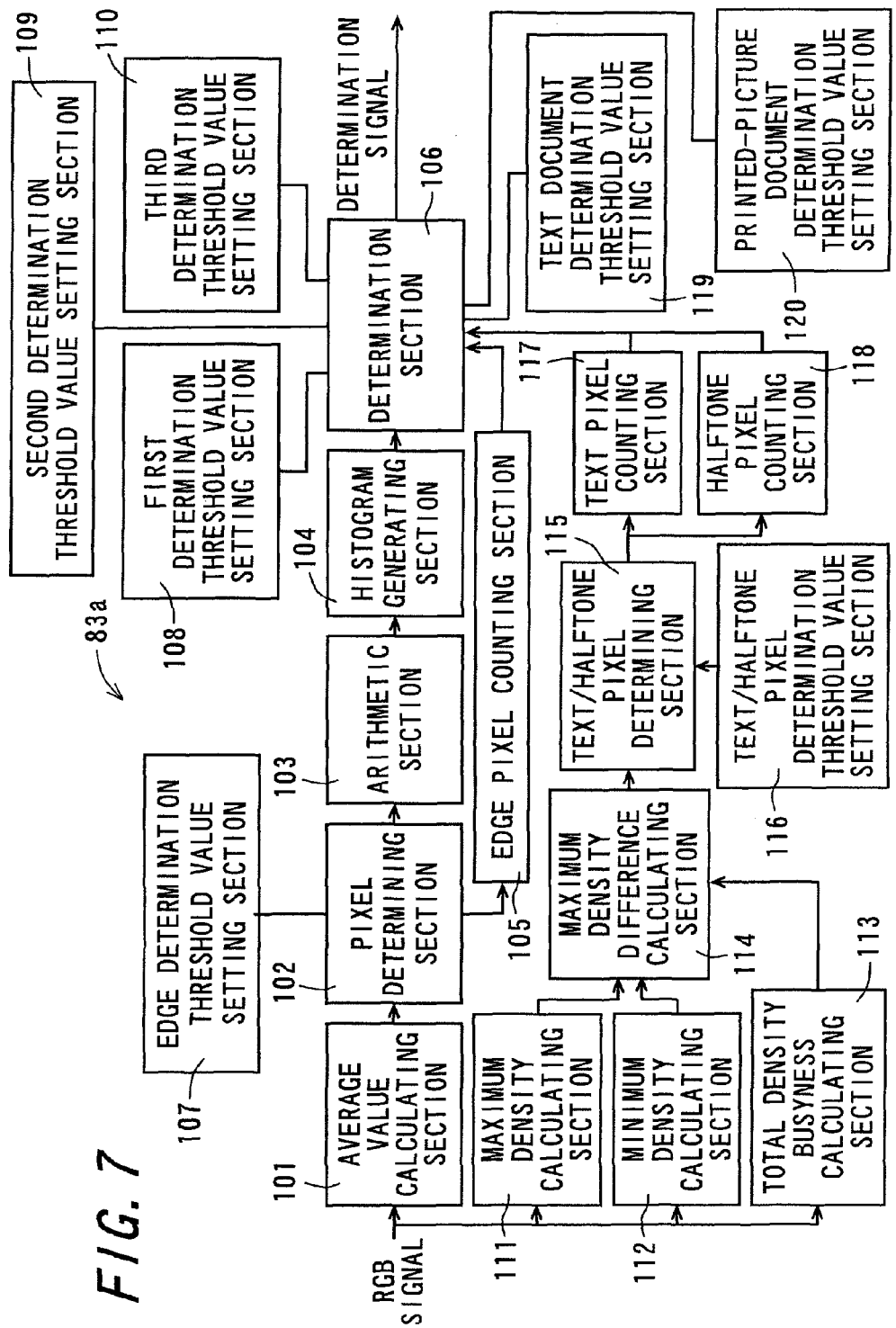
FIG. 7 is a block diagram showing a configuration of a document type automatic discrimination section that makes a type discrimination between a blank page document and other documents.
Figure 8A:
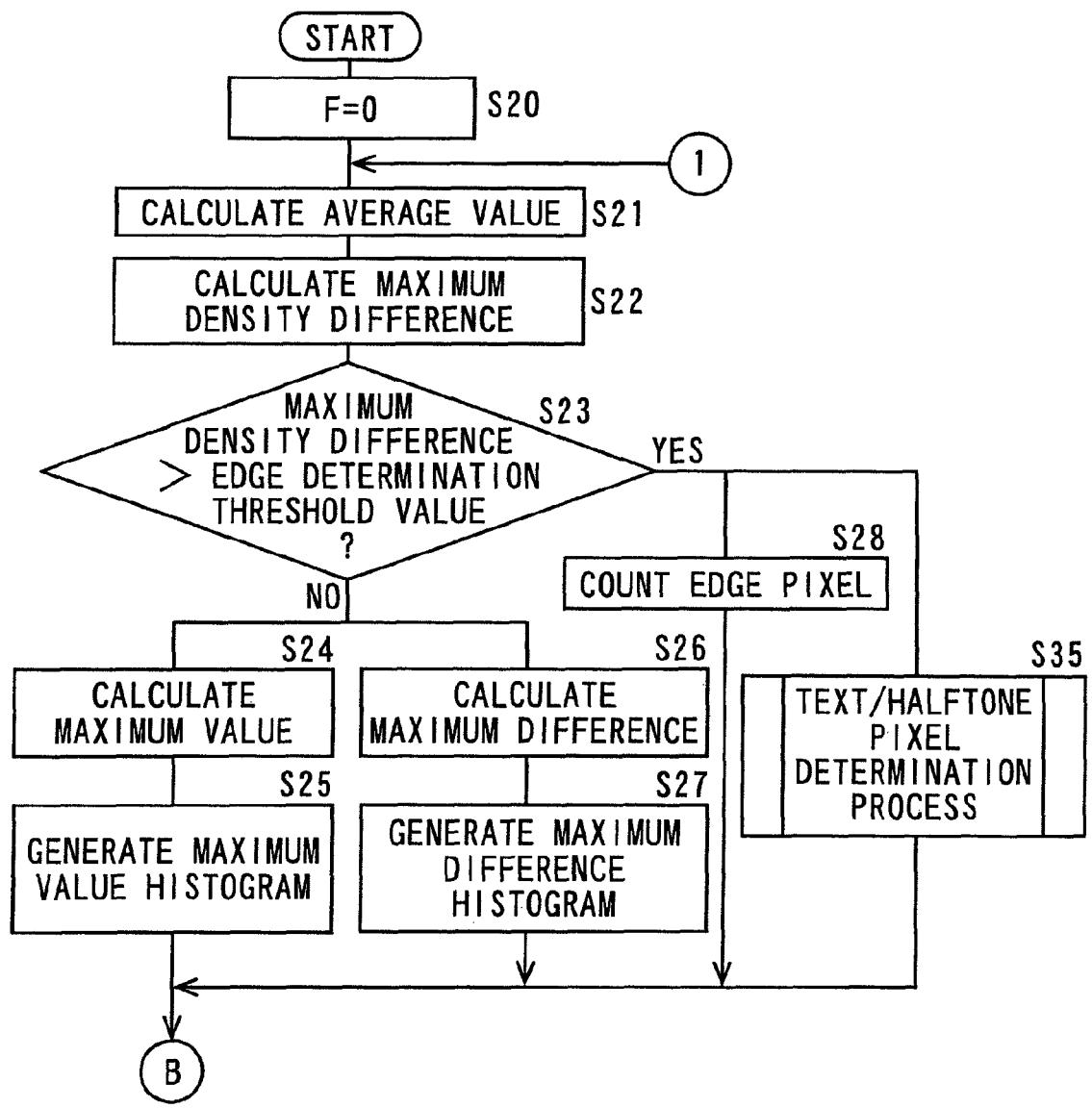
Figure 10:
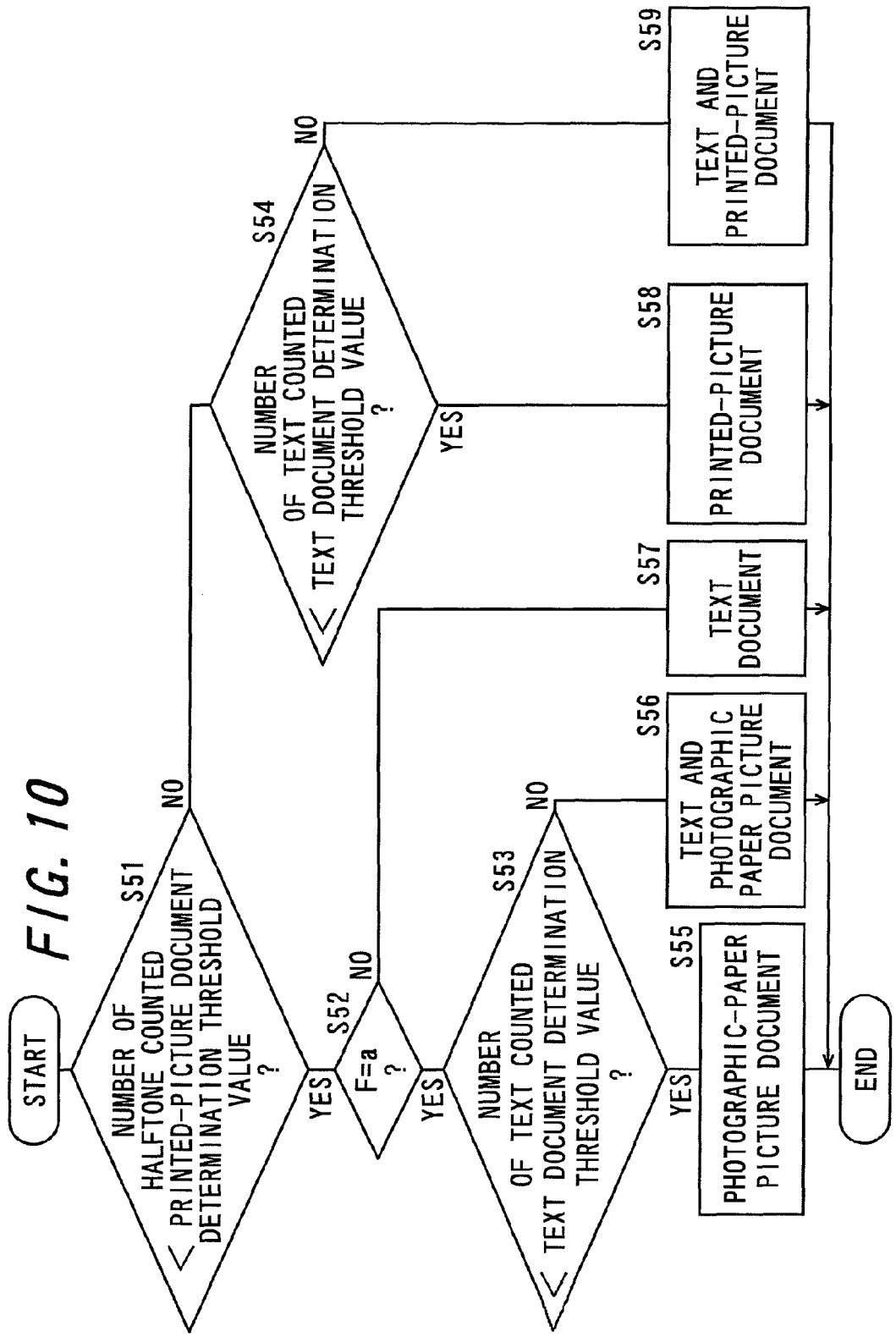
FIG. 10 is a flowchart showing a document determination process.

FIG. 7 is a block diagram showing a configuration of a document type automatic discrimination section 83*a* that makes a type discrimination between a blank page document and other documents. FIGS. 8A and 8B are flowcharts showing a discrimination process of the document type automatic discrimination section 83*a*. FIG. 9 is a flowchart showing a text/halftone pixel determination process. FIG. 10 is a flowchart showing a document determination process.

Those parts that perform the same operations as parts constituting the document type automatic discrimination section 83 shown in FIG. 3 are denoted by the same reference numerals and description thereof will be omitted.

First, a flag F which is used in a determination process (described later) is initialized such that F=0 (step S20).

The operations in steps S21 to 329 are the same as those in steps S1 to S9 in the flowcharts shown in FIGS. 4A and 4B and thus description thereof will be omitted. When it is determined that the process for all pixels is completed in step S29, the histograms respectively for the maximum value and the maximum difference generated by the histogram generating, section 104 are compared with a second determination threshold value provided from the second determination threshold value setting section 109, to calculate, for each of the maximum value and the maximum difference, a total value for the number of bins in which the frequency-of-occurrence value is greater than the second determination threshold value, to use the total values respectively as a maximum value histogram document density width and a maximum difference histogram document density width (steps S30 and S31). Each of the calculated maximum value histogram document density width and maximum difference histogram document density width is compared with a third determination threshold value provided from the third determination threshold value setting section 110 (step S32). If each of the calculated maximum value histogram document density width and maximum difference histogram document density width is greater than the third determination threshold value, it indicates that a photographic-paper picture region is present, the flag F is set at a (step S36), and thus it is determined that the document is not a blank page document (step S37).

If each of the calculated maximum value histogram document density width and maximum difference histogram document density width is equal to or smaller than the above third determination threshold value (in case of NO in step 32), then the document is determined to be a blank page document (step S14). The determination section 106 compares the number of edge pixels counted by the edge pixel counting section 105 with a first determination threshold value provided from the first determination threshold value setting section 108 (step S33). If the number of edge pixels is less than or equal to the first determination threshold value, it indicates that either a text region or a halftone region is present, and thus, it is determined that the document is not a blank page document (step S37). If the number of edge pixels is greater than the first determination threshold value, it is determined that the document is a blank page document (step S34).

RGB signals inputted to the document type automatic discrimination section 83*a* are inputted to a maximum density calculating section 111, a minimum density calculating section 112, and a total density busyness calculating section 113, in parallel with the above-described processes in the average value calculating section 101, the pixel determining section 102, the arithmetic section 103, and the histogram generating section 104.

Pixels that are determined to be edge pixels by the pixel determining section 102 are counted by the edge pixel counting section 105. A text/halftone pixel determining section 115 performs a text/halftone pixel determination process in which determination on whether the pixel is a text pixel or a halftone pixel is made (step S35).

Referring to FIG. 9, in the text/halftone pixel determination process, first, the maximum density calculating section 111 and the minimum density calculating section 112 calculate a maximum density value and a minimum density value within, for example, a 7×7 pixel block including a pixel of interest (steps S39 and S40). A maximum density difference calculating section 114 calculates a maximum density difference using the calculated minimum density value and maximum density value (step S41).

The total density busyness calculating section 113 calculates, in the 7×7 pixel block, a total density busyness which is the sum total of absolute values of density differences between adjacent pixels (step S42). For example, a total density busyness for a main scanning direction and a total density busyness for a sub-scanning direction are calculated and a sum of them is used as a calculated total density busyness. Furthermore, the calculated total density busyness is compared with a product of a text/halftone pixel determination threshold value provided from a text/halftone pixel determination threshold value setting section 116 and the calculated maximum density difference, to make determination between a text region and a halftone region (step S43). Note that the text/halftone pixel determination can be made by the steps described in, for example, Japanese Unexamined Patent Publication JP-A 2002-232708.

A pixel that is determined to be a text pixel is counted by a text pixel counting section 117 (step S44) and a pixel that is determined to be a halftone pixel is counted by a halftone pixel counting section 118 (step S45).

Returning to FIG. 8B, when the determination section 106 determines that the document is not a blank page document (step S37), the determination section 106 performs an overall document determination process using a result that the document is determined to be a photographic-paper picture document (flag F=a, step S36), the number of text counted, and the number of halftone counted (step S38).

FIG. 10 is a flowchart showing a document determination process.

First, the determination section 106 compares the number of halftone counted with a printed-picture document determination threshold value (e.g., 20% of the total number of pixels) which is set by a printed-picture document determination threshold value setting section 120 (step S51). If the number of halftone counted is smaller than the printed-picture document determination threshold value, then it is determined whether the flag F=a (step S52).

If F=a is satisfied, then the determination section 106 compares the number of text counted with a text document determination threshold value (e.g., 10% of the total number of pixels) which is set by a text document determination threshold value setting section 119 (step S53). If the number of text counted is smaller than the text document determination threshold value, then the document is determined to be a photographic-paper picture document (step S55), and if the number of text counted is greater than or equal to the text document determination threshold value, then the document is determined to be a text and photographic-paper picture document (step S56). If F=a is not satisfied, then the document is determined to be a text document (step S57).

Furthermore, when the number of halftone counted is greater than or equal to the printed-picture document determination threshold value, too, the determination section 106 compares the number of text counted with a text document determination threshold value (e.g., 10% of the total number of pixels) which is set by the text document determination threshold value setting section 119 (step S54). If the number of text counted is smaller than the text document determination threshold value, then the document is determined to be a printed-picture document (step S58), and if the number of text counted is greater than or equal to the text document determination threshold value, then the document is determined to be a text and printed-picture document (step S59).

FIG. 11 is a block diagram showing a configuration of an image reading apparatus 76 according to another embodiment of the invention.

The image reading apparatus 76 includes a color image input apparatus 72 and a color image processing apparatus 73a. The color image processing apparatus 73a includes an A/D conversion section 81, a shading correction section 82, and a document type automatic discrimination section 83.

The color image input apparatus (image scanning section) 72 includes, for example, a scanner section including a CCD image sensor. The color image input apparatus 72 reads a reflected light image from a document by the CCD image sensor as RGB analogue signals, and inputs the RGB analogue signals to the color image processing apparatus 73a.

The analogue signals read by the color image input apparatus 72 are transmitted, within the color image processing apparatus 73a, to the A/D conversion section 81, the shading correction section 82, and the document type automatic discrimination section 83 in this order.

The A/D conversion section 81 converts the RGB analogue signals into digital signals. The shading correction section 82 performs a process of removing various distortions occurring in a lighting system, an image focusing system, and an image sensing system of the color image input apparatus 72, on the digital RGB signals sent from the A/D conversion section 81. Also, the shading correction section 82 makes a color balance adjustment.

The document type automatic discrimination section 83 converts the RGB signals (RGB reflectivity signals) from which various distortions have been removed and on which a color balance adjustment has been made by the shading correction section 82, into signals, such as density (pixel value) signals, which are easy for the color image processing apparatus 73a to process, and determines whether the document is a blank page document. The document type automatic discrimination section 83 may be configured to make not only a blank page document determination but also a document type discrimination such as whether the document is a text document or a printed-picture document or a text and printed-picture document including both text and a printed-picture.

Data of image and a document type discrimination signal outputted from the image reading apparatus 76 are transmitted to a printer, a multi-function peripheral, or a computer through a network.

As another embodiment of the invention, it is also possible to record an image processing method in which the above-described blank page image determination process is performed, in a computer-readable recording medium on which a program code (an executable program, an intermediate code program, and a source program) of a program to be executed by a computer is recorded.

Accordingly, the recording medium on which the program code is recorded that performs the image processing method in which the blank page image determination process is performed can be portably provided.

Note that in the present embodiment, as the recording medium, a memory which is not shown because processes are performed by a microcomputer, e.g., a ROM, itself may serve as a program medium, or alternatively, a program code reading apparatus, although not shown, may be provided as an external storage apparatus and by inserting the recording medium thereinto, the apparatus may serve as a readable program medium.

In any case, a stored program may be executed by a microprocessor accessing the program, or in any case, a scheme may be employed in which a program code is read, the read program code is downloaded into a program storage area (not shown) of a microcomputer, and the program code is executed. The program for download is stored in advance in a main body apparatus.

Here, the above-described program medium is a recording medium configured to be separable from a main body, and may be a medium that fixedly carries a program thereon, including a tape type, such as a magnetic tape or cassette tape, a disk type including a magnetic disk such as a flexible disk or hard disk or an optical disk such as a CD-ROM/MO/MD/DVD, a card type, such as an IC card (including a memory card)/optical card, or a semiconductor memory such as a mask ROM, EPROM (Erasable Programmable Read Only Memory), EEPROM (Electrically Erasable Programmable Read Only Memory), or flash ROM.

In the present embodiment, since a system configuration is capable of connecting a communication network including the Internet, the program medium may be a medium that carries thereon a program such that a program code is downloaded from the communication network in a flowing manner. Note that when a program code is thus downloaded from the communication network, the program for download may be stored in advance in a main body apparatus or may be installed from another recording medium. Note also that the invention can also be implemented in the form of a computer data signal in which the above-described program code is embodied by electronic transmission and which is embedded in a carrier wave.

The above-described recording medium is read by a program reading apparatus included in a digital color image forming apparatus or computer system, whereby the aforementioned image processing method is performed.

A computer system includes an image input apparatus such as a flatbed scanner, film scanner, or digital camera; a computer that performs various processes, such as the aforementioned image processing method, by a predetermined program being loaded; an image display device, such as a CRT display or liquid crystal display, that displays processing results produced by the computer; and a printer that outputs the processing results produced by the computer to paper, etc. The computer system further includes a network card, a modem, etc., that serve as a communicating section for establishing a connection to a server, etc., through a network.

The invention may be embodied in other specific forms without departing from the spirit or essential features thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus that determines, based on data of image including a plurality of pixels, whether a document is of a blank page image, the apparatus comprising:
    a determination section that performs a determination process to determine whether the document is of a blank page image by comparing features calculated from the data of image with a threshold value; and
    a setting section that sets, when at least one of scanning modes in reading data of image from the document or output modes in printing out data of image is inputted, the threshold value used in the determination process in accordance with the mode inputted.

2. An image processing apparatus that determines, based on data of image including a plurality of pixels, whether the data of image is of a blank page image, the apparatus comprising:
    an average value calculating section that calculates, for respective color components, an average value of pixel values within a first pixel block composed of a plurality of pixels including a pixel of interest, to define the calculated average values as a pixel value of the pixel of interest;
    a histogram generating section that obtains, for respective pixels of interest, a maximum value of the average values among the color components and a maximum difference in the average values among the color components, based on the average values for the respective color components which are calculated by the average value calculating section, and generates histograms respectively for the maximum value and the maximum difference in which histograms a number of pixels for a density bin is considered as a frequency-of-occurrence value;
    a determination section that obtains a number of density bin having a predetermined frequency-of-occurrence value or more for each of the histograms for the maximum value and the maximum difference which are generated by the histogram generating section, respectively, and determines that the data of image is of a blank page image when both of the numbers of density bins are less than or equal to a bin threshold value; and
    a setting section that sets, when at least one of scanning modes in reading data of image from a document or output modes in printing out data of image is inputted, the bin threshold value in accordance with the mode inputted.

3. The image processing apparatus of claim 2, further comprising:
    a pixel determining section that calculates, for respective color components, density information about density in a second pixel block composed of a plurality of pixels including a pixel of interest, compares the calculated density information with a predetermined density threshold value to determine whether the pixel of interest is an edge pixel, and counts a number of pixels determined to be edge pixels,
    wherein the determination section determines that the data of image is of a blank page image when both of the numbers of density bins are less than or equal to the bin threshold value and the number of pixels determined to be edge pixels is less than or equal to a number-of-pixel threshold value, and
    the setting section sets, when at least one of scanning modes in reading data of image from a document or output modes in printing out data of image is inputted, the number-of-pixel threshold value in accordance with the mode inputted.

4. An image forming apparatus including the image processing apparatus of claim 1.

5. An image forming apparatus including the image processing apparatus of claim 2.

6. An image processing method in which based on data of image including a plurality of pixels, it is determined whether a document is of a blank page image, the method comprising:
    a determination step of performing a determination process to determine whether the document is of a blank page image by comparing features calculated from the data of image with a threshold value; and
    a setting step of setting, when at least one of scanning modes in reading data of image from the document or output modes in printing out data of image is inputted, the threshold value used in the determination process in accordance with the mode inputted.

7. An image processing method in which based on data of image including a plurality of pixels, it is determined whether the data of image is of a blank page image, the method comprising:
    an average value calculation step of calculating, for respective color components, an average value of pixel values within a first pixel block composed of a plurality of pixels including a pixel of interest, to define the calculated average values as a pixel value of the pixel of interest;
    a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value;
    a determination step of obtaining a number of density bin having a predetermined frequency-of-occurrence value or more for each of the histograms for the maximum value and the maximum difference which are generated in the histogram generation step, respectively, and determining that the data of image is of a blank page image when both of the numbers of density bins are less than or equal to a bin threshold value; and
    a setting step of setting, when at least one of scanning modes in reading data of image from a document or output modes in printing out data of image is inputted, the bin threshold value in accordance with the mode inputted.

8. The image processing method of claim 7, further comprising:
    a pixel determination step of calculating, for respective color components, density information about density in a second pixel block composed of a plurality of pixels including a pixel of interest, comparing the calculated density information with a predetermined density threshold value to determine whether the pixel of interest is an edge pixel, and counting a number of pixels determined to be edge pixels, wherein, in the determination step, it is determined that the data of image is of a blank page image when both of the numbers of density bins are less than or equal to the bin threshold value and the number of pixels determined to be edge pixels is less than or equal to a number-of-pixel threshold value, and in the setting step, when at least one of scanning modes in reading data of image from a document or output modes in printing out data of image is inputted, the number-of-pixel threshold value is set in accordance with the mode inputted.

9. A computer-readable tangible recording medium encoded with instructions, wherein the instructions when executed on a computer cause the computer to perform an image processing method, the image processing method comprising a determination step of performing a determination process to determine whether a document is of a blank page image by comparing features calculated from the data of image with a threshold value; and a setting step of setting, when at least one of scanning modes in reading data of image from the document or output modes in printing out data of image is inputted, the threshold value used in the determination process in accordance with the mode inputted.

10. A computer-readable tangible recording medium encoded with instructions, wherein the instructions when executed on a computer cause the computer to perform an image processing method, the image processing method comprising:

an average value calculation step of calculating, for respective color components, an average value of pixel values within a first pixel block composed of a plurality of pixels including a pixel of interest, to define the calculated average values as a pixel value of the pixel of interest;

a histogram generation step of obtaining, for respective pixels of interest, a maximum value of the average values among the color components and a maximum difference in the average values among the color components, based on the average values for the respective color components which are calculated in the average value calculation step, and generating histograms respectively for the maximum value and the maximum difference in which histograms a number of pixels for a density bin is considered as a frequency-of-occurrence value;

a determination step of obtaining a number of density bin having a predetermined frequency-of-occurrence value or more for each of the histograms for the maximum value and the maximum difference which are generated in the histogram generation step, respectively, and determining that the data of image is of a blank page image when both of the numbers of density bins are less than or equal to a bin threshold value; and a setting step of setting, when at least one of scanning modes in reading data of image from a document or output modes in printing out data of image is inputted, the bin threshold value in accordance with the mode inputted.

* * * * *